US011518155B2

(12) United States Patent
Tsuboi et al.

(10) Patent No.: US 11,518,155 B2
(45) Date of Patent: Dec. 6, 2022

(54) MULTILAYER TUBE

(71) Applicant: UBE INDUSTRIES, LTD., Ube (JP)

(72) Inventors: Kazutoshi Tsuboi, Ube (JP); Yukiko Nakao, Ube (JP); Ryousuke Sasaki, Ube (JP); Ryu Fukuda, Ube (JP)

(73) Assignee: UBE INDUSTRIES, LTD., Ube (JP)

( * ) Notice: Subject to any disclaimer, the term of this patent is extended or adjusted under 35 U.S.C. 154(b) by 0 days.

(21) Appl. No.: 17/418,631

(22) PCT Filed: Oct. 25, 2019

(86) PCT No.: PCT/JP2019/042000
§ 371 (c)(1),
(2) Date: Jun. 25, 2021

(87) PCT Pub. No.: WO2020/137128
PCT Pub. Date: Jul. 2, 2020

(65) Prior Publication Data
US 2022/0063255 A1    Mar. 3, 2022

(30) Foreign Application Priority Data
Dec. 27, 2018   (JP) .............................. JP2018-245633

(51) Int. Cl.
*B32B 27/34*  (2006.01)
*B32B 1/08*   (2006.01)
*B32B 27/08*  (2006.01)
*C08L 77/06*  (2006.01)
*F16L 11/04*  (2006.01)

(52) U.S. Cl.
CPC ................ *B32B 27/34* (2013.01); *B32B 1/08* (2013.01); *B32B 27/08* (2013.01); *C08L 77/06* (2013.01); *F16L 11/04* (2013.01); *B32B 2597/00* (2013.01)

(58) Field of Classification Search
CPC .......... B32B 27/34; B32B 1/08; B32B 27/08; B32B 2597/00; C08L 77/06; F16L 11/04
See application file for complete search history.

(56) References Cited

U.S. PATENT DOCUMENTS

| | | |
|---|---|---|
| 6,670,004 B1 | 12/2003 | Green |
| 2004/0071913 A1 | 4/2004 | Bellet |
| 2009/0065085 A1 | 3/2009 | Dowe et al. |
| 2017/0210105 A1 | 7/2017 | Endo et al. |
| 2019/0091962 A1 | 3/2019 | Kurumiya et al. |

FOREIGN PATENT DOCUMENTS

| | | |
|---|---|---|
| JP | 2000-238218 A | 9/2000 |
| JP | 2004-34705 A | 2/2004 |
| JP | 2007-118222 A | 5/2007 |
| JP | 2010-507501 A | 3/2010 |
| JP | 2014-104691 A | 6/2014 |
| JP | 2014-240139 A | 12/2014 |
| JP | 2016-130273 A | 7/2016 |
| JP | 2019-59059 A | 4/2019 |
| WO | WO 2016/009769 A1 | 1/2016 |
| WO | WO 2017/170985 A1 | 10/2017 |

OTHER PUBLICATIONS

English machine translation of JP2014-240139. (Year: 2014).*
International Search Report, issued in PCT/JP2019/042000, PCT/ISA/210, dated Jan. 21, 2020.
European Patent Office Communication and extended search report issued in the corresponding European Patent Application No. 19903372.1 dated Jul. 20, 2022.
Chinese Office Action and Search Report for corresponding Chinese Application No. 201980086288.X, dated Aug. 24, 2022.

\* cited by examiner

*Primary Examiner* — Michael C Miggins
(74) *Attorney, Agent, or Firm* — Birch, Stewart, Kolasch & Birch, LLP

(57) ABSTRACT

This is to provide a multilayer tube excellent in interlayer adhesiveness and durability thereof while maintaining various characteristics such as low temperature impact resistance, bursting pressure strength and flexibility.
In a multilayer tube having at least two kinds of layers and the both layers are adjacent to each other, an aliphatic polyamide composition constituting one of the layers contains an aliphatic polyamide having a ratio of a number of methylene groups to a number of amide groups of a specific value or more and a copolymerized polyamide having a specific unit, and an elastomeric polymer which may contain a constitutional unit derived from an unsaturated compound having a carboxyl group(s) and/or an acid anhydride group(s).

13 Claims, No Drawings

MULTILAYER TUBE

TECHNICAL FIELD

The present invention relates to a multilayer.

BACKGROUND ART

In chemical solution and/or gas transport tubes for automobile piping such as hydraulic tubes for power transmission for general industry and pneumatic tubes of air brakes for automobile, etc., from the viewpoints of weight reduction and workability (assembling property), its main material is being replaced from a metal with a resin which is excellent in rust preventing property and lightweight. In general, as a material for chemical solution and/or gas transport tubes, polyamide 11 or polyamide 12 which is excellent in strength, toughness, chemical resistance, flexibility, etc., is used.

On the other hand, thermoplastic polyurethanes may be used in some cases as a material for chemical solution and/or gas transport tubes. These are less expensive than the polyamide 11 or the polyamide 12 but are inferior in mechanical strength and chemical resistance.

For example, long-chain aliphatic polyamides such as polyamide 612, polyamide 11, polyamide 12, etc., have good mechanical characteristics such as bursting pressure strength, low temperature impact resistance, etc., have resistance to stress crack formation, and excellent in resistance to chemicals such as fuel, oil, hydrocarbon, etc., and hydrolysis resistance. By maximizing these characteristics of the long-chain aliphatic polyamides, and to reduce the cost, various investigations such as adhesion and lamination with the other inexpensive polyamide other than the long-chain aliphatic polyamides have been carried out.

For example, it has been proposed a multilayer tube for air brakes having an outermost layer comprising polyamide 11 or polyamide 12, an adhesive layer comprising a modified polyolefin or polyamide 612, and an inner layer comprising impact resistance-improved polyamide 6 a bending elasticity at high temperature of which is a specific value or more, and having an outermost layer comprising polyamide 11 or polyamide 12, an adhesive layer comprising a modified polyolefin or polyamide 612, an intermediate layer comprising impact resistance-improved polyamide 6 or polyamide 66 a bending elasticity at high temperature of which is a specific value or more, an adhesive layer comprising a modified polyolefin or polyamide 612, and an innermost layer comprising polyamide 11 or polyamide 12 (see Patent Document 1).

Also, it has been proposed a laminated hose for compressed air having an outermost layer comprising polyamide 11, polyamide 12, aliphatic polyamide which comprises an aliphatic diamine having 6 or more and 12 or less carbon atoms and an aliphatic dicarboxylic acid having 9 or more and 12 or less carbon atoms, a long-chain aliphatic polyamide such as polyamide 11/12 copolymer, etc., an inner layer of a polyamide, an impact resistance-improved polyamide, a polyamide elastomer, a mixture of a polyamide and an polyamide elastomer, and an adhesive layer comprising a polyamide copolymer mainly composed of a modified polyolefin or polyamide 6/12 copolymer (see Patent Document 2).

Further, it has been proposed a multilayer tube for air brakes constituted by an outer layer comprising a material in which a number of an average carbon atom of a monomer unit is 8 or more, intermediate layers comprising polyamide 6, polyamide 66 and polyamide 6/66 copolymer impact resistance of which is not improved, and an inner layer comprising a material in which a number of an average carbon atom of a monomer unit is 8 or more, and a thickness of the intermediate layer is in a ratio of a specific range (see Patent Document 3). In this technique, there is disclosed a multilayer tube in which, when polyamide 12 is used as a polyamide in which a number of an average carbon atom of a monomer unit is 8 or more as the outer layer material, between the intermediate layers comprising polyamide 6, polyamide 66 and polyamide 6/66 copolymer impact resistance of which is not improved, polyamide 612 in which a number of an average carbon atom of a monomer unit is 9 is used, and polyamide 12, polyamide 612, polyamide 6, polyamide 612 and polyamide 12 are disposed in this order from the outside to the inside.

PRIOR ART DOCUMENT

Patent Document

Patent Document 1: U.S. Pat. No. 6,670,004
Patent Document 2: JP2004-34705A
Patent Document 3: JP2010-507501A

SUMMARY OF THE INVENTION

Problems to be Solved by the Invention

In these multilayer tubes, there is no disclosure of specific technical data regarding not only the interlayer adhesiveness (durability of interlayer adhesiveness) after contact and immersion with fuel for a long time or after heat treatment, but also initial interlayer adhesiveness, and as shown later, the multilayer tubes of Patent Documents 1 to 3 have sufficient initial interlayer adhesiveness to some extent, but as for durability of interlayer adhesiveness, it was found that there was room for improvement in the points that after contact and immersion with fuel for a long time or after heat treatment.

Thus, an object of the present invention is to provide a multilayer excellent in interlayer adhesiveness, and durability thereof without using an adhesive layer.

Means to Solve the Problems

The present inventors have intensively studied to solve the above-mentioned problems, and as a result, they have found that, in a multilayer having at least two kinds of layers and the both layers are adjacent to each other, when an aliphatic polyamide composition constituting one of the layers contains an aliphatic polyamide having a ratio of a number of the methylene groups to a number of the amide groups of a specific value or more, a polyamide which is a copolymer comprising a specific monomer species, and an elastomeric polymer which may contain a constitutional unit derived from an unsaturated compound having a carboxyl group(s) and/or an acid anhydride group(s), a multilayer excellent in interlayer adhesiveness and durability thereof can be obtained without using an adhesive layer.

That is, the present invention relates to a multilayer which comprises two or more layers containing Layer (a) and Layer (b), wherein at least a pair of the Layer (a) and the Layer (b) are disposed adjacent to each other, the Layer (a) contains an aliphatic polyamide composition (A), the Layer (b) contains an aliphatic polyamide composition (B), the aliphatic polyamide composition (A) contains a polyamide (A1), a polyamide (A2) and an elastomeric polymer (A3), the polyamide (A1) is an aliphatic polyamide which has a ratio of a number of methylene groups to a number of amide groups of 8.0 or more, and which does not contain a copolymer containing a unit "a" derived from ε-caprolactam or ε-aminocaproic acid and a unit "b" derived from aminododecanoic acid or w-laurolactam, and is contained in an amount of 30% by mass or more and 85% by mass or less in the aliphatic polyamide composition (A), the polyamide (A2) is an aliphatic polyamide which contains a copolymer containing a unit "a" derived from ε-caprolactam or ε-aminocaproic acid and a unit "b" derived from aminododecanoic acid or ω-laurolactam, and is contained in an amount of 10% by mass or more and 35% by mass or less in the aliphatic polyamide composition (A), the elastomeric polymer (A3) is an elastomeric polymer which may contain a constitutional unit derived from an unsaturated compound having a carboxyl group(s) and/or an acid anhydride group(s), and is contained in an amount of 5% by mass or more and 30% by mass or less in the aliphatic polyamide composition (A), the aliphatic polyamide composition (B) contains a polyamide (B1) and an elastomeric polymer (B2), the polyamide (B1) is an aliphatic polyamide which has a ratio of a number of methylene groups to a number of amide groups of less than 8.0, and is contained in an amount of 55% by mass or more and 95% by mass or less in the aliphatic polyamide composition (B), and the elastomeric polymer (B2) is an elastomeric polymer which contains a constitutional unit derived from an unsaturated compound having a carboxyl group(s) and/or an acid anhydride group(s), and is contained in an amount of 5% by mass or more and 30% by mass or less in the aliphatic polyamide composition (B).

Preferred embodiments of the multilayer are shown below. A plurality of the preferred embodiments can be combined.

[1]

A multilayer wherein the polyamide (A1) is at least one kind of a homopolymer selected from the group consisting of polyundecamide (polyamide 11), polydodecamide (polyamide 12), polyhexamethylene dodecamide (polyamide 612), polydecamethylene sebacamide (polyamide 1010), polydecamethylene dodecamide (polyamide 1012), and polydodecamethylene dodecamide (polyamide 1212), and/or at least one kind of a copolymer using two or more kinds of raw material monomers forming the homopolymers.

[2] The multilayer wherein the polyamide (A2) is a copolymer selected from polyamide 6/12 and polyamide 6/66/12.

[3] The multilayer wherein the polyamide (A2) contains 50% by mass or more of a unit "a" derived from ε-caprolactam or ε-aminocaproic acid.

[4] The multilayer wherein the elastomeric polymer (A3) contains an elastomeric polymer which contains a constitutional unit derived from an unsaturated compound having a carboxyl group(s) and/or an acid anhydride group(s) in an amount of 60% by mass or more in 100% by mass of the elastomeric polymer (A3).

[5] The multilayer wherein the polyamide (B1) is at least one kind of a homopolymer selected from the group consisting of polycaproamide (polyamide 6), polyhexamethylene adipamide (polyamide 66), polyhexamethylene azelamide (polyamide 69), and polyhexamethylene sebacamide (polyamide 610), and/or at least one kind of a copolymer using two or more kinds of a raw material monomer forming the homopolymers.

[6] The multilayer wherein when the terminal amino group concentration which is summed values of the respective terminal amino group concentrations (μeq/g) of the polyamide (A1) and the polyamide (A2) per 1 g of the aliphatic polyamide composition (A) multiplying a mixing mass ratio thereof is made [A] (μeq/g), and when the terminal carboxyl group concentration which is summed values of the respective terminal carboxyl group concentrations (μeq/g) of the polyamide (A1) and the polyamide (A2) per 1 g of the aliphatic polyamide composition (A) multiplying a mixing mass ratio thereof is made [B] (μeq/g), then [A]>[B]+5.

[7] The multilayer wherein the Layer (a) contains 40% by mass or more and 100% by mass or less of the aliphatic polyamide composition (A), and the Layer (b) contains 60% by mass or more and 100% by mass or less of the aliphatic polyamide composition (B).

[8] The multilayer which is produced by coextrusion molding.

[9] The multilayer wherein a shape is a hollow body.

[10] The multilayer which is used as a chemical solution and/or gas transport tube.

[11] The multilayer which has at least one of the Layer (b) disposed inside the Layer (a).

[12] The multilayer wherein the Layer (a), the Layer (b) and the Layer (a) are laminated in this order from the outside, and the respective layers are adjacent to each other.

Effects of the Invention

According to the present invention, it can provide a multilayer excellent in interlayer adhesiveness and durability thereof without using an adhesive layer.

EMBODIMENTS TO CARRY OUT THE INVENTION

The multilayer contains at least a pair of Layer (a) and Layer (b), and has two or more layers.

1. Layer (a)

Layer (a) of the multilayer contains an aliphatic polyamide composition (A). From the viewpoints of heat resistance, chemical resistance and mechanical properties, the aliphatic polyamide composition (A) is preferably contained in an amount of 40% by mass or more and 100% by mass or less in Layer (a), and more preferably contained in an amount of 45% by mass or more and 100% by mass or less.

[Aliphatic Polyamide Composition (A)]

The aliphatic polyamide composition (A) contains polyamide (A1), polyamide (A2) and the elastomeric polymer (A3), the polyamide (A1) is an aliphatic polyamide having a ratio of a number of methylene groups to a number of amide groups of 8.0 or more, is an aliphatic polyamide which does not contain a copolymer containing a unit "a" derived from ε-caprolactam or ε-aminocaproic acid, and a unit "b" derived from aminododecanoic acid or ω-laurolactam, and is contained in an amount of 30% by mass or more and 85% by mass or less in the aliphatic polyamide composition (A), the polyamide (A2) is an aliphatic polyamide which contains a copolymer containing a unit "a" derived from ε-caprolactam or ε-aminocaproic acid, and a unit "b" derived from aminododecanoic acid or ω-laurolactam, and is contained in an amount of 10% by mass or more and 35% by mass or less in the aliphatic polyamide composition (A), and the elastomeric polymer (A3) is an elastomeric polymer which may contain a constitutional unit derived from an unsaturated compound having a carboxyl group(s) and/or an acid anhydride group(s), and is contained in an amount of 5% by mass or more and 30% by mass or less in the aliphatic polyamide composition (A) (hereinafter sometimes referred to as the aliphatic polyamide composition (A).). In addition, the aliphatic polyamide composition (A) preferably does not contain a plasticizer from the viewpoint of durability of interlayer adhesiveness after contacting and immersing with a fuel for a long time and/or after heat treatment for a short time.

[Polyamide (A1)]

The polyamide (A1) is an aliphatic polyamide containing an aliphatic group in a constitutional repeating unit, having an amide bond (—CONH—) in the main chain and a ratio of a number of the methylene groups ([$CH_2$]) to a number of the amide groups ([NHCO]) [$CH_2$]/[NHCO] (hereinafter the ratio of a number of methylene groups to a number of amide groups is sometimes referred to as [$CH_2$]/[NHCO].) of 8.0 or more, and is an aliphatic polyamide other than a copolymer containing a unit "a" derived from ε-caprolactam or ε-aminocaproic acid and a unit "b" derived from aminododecanoic acid or ω-laurolactam (hereinafter it is sometimes referred to as polyamide (A1)). The [$CH_2$]/[NHCO] of the polyamide (A1) is preferably 9.0 or more, more preferably 9.5 or more, and further preferably 10.0 or more. When the ratio of a number of the methylene groups ([$CH_2$]) to a number of the amide groups ([NHCO]) of the polyamide (A1) is less than the value mentioned above, mechanical characteristics and chemical resistance of the obtained multilayer are poor.

Incidentally, the polyamide (A1) is preferably a homopolymer of an aliphatic polyamide having a ratio of a number of methylene groups to a number of amide groups [$CH_2$]/[NHCO] of 8.0 or more; a polyamide copolymer using at least two components of only the raw material monomers (constitutional repeating unit) that forms an aliphatic polyamide having a ratio [$CH_2$]/[NHCO] of a number of methylene groups to a number of amide groups of 8.0 or more; and a polyamide copolymer comprising at least one component of the raw material monomer (constitutional repeating unit) that forms an aliphatic polyamide having the ratio [$CH_2$]/[NHCO] of a number of methylene groups to a number of amide groups of 8.0 or more, and using at least one component of the raw material monomer (constitutional repeating unit) that forms an aliphatic polyamide having a ratio [$CH_2$]/[NHCO] of a number of methylene groups to a number of amide groups of less than 8.0. The polyamide (A1) does not contain a copolymer that contains a unit "a" derived from ε-caprolactam or ε-aminocaproic acid and a unit "b" derived from aminododecanoic acid or ω-laurolactam.

Examples of the preferable polyamide (A1) are explained by dividing into the aliphatic polyamide homopolymer (A1X) (hereinafter it is sometimes referred to as polyamide (A1X).) having the ratio [$CH_2$]/[NHCO] of a number of methylene groups to a number of amide groups of 8.0 or more, the polyamide copolymer (A1XX) (hereinafter it is sometimes referred to as polyamide (A1XX).) using at least two components of only the raw material monomers (constitutional repeating unit) that forms an aliphatic polyamide having the ratio [$CH_2$]/[NHCO] of a number of methylene groups to a number of amide groups of 8.0 or more, and the polyamide copolymer (A1Y) (hereinafter it is sometimes referred to as polyamide (A1Y).) comprising at least one component of the raw material monomer (constitutional repeating unit) that forms an aliphatic polyamide having the ratio [$CH_2$]/[NHCO] of a number of methylene groups to a number of amide groups of 8.0 or more, and using at least one component of the raw material monomer (constitutional repeating unit) that forms an aliphatic polyamide having the ratio [$CH_2$]/[NHCO] of a number of methylene groups to a number of amide groups of less than 8.0.

As the polyamide (A1X) having the ratio [$CH_2$]/[NHCO] of a number of methylene groups to a number of amide groups of 8.0 or more, there may be mentioned polyundecamide (polyamide 11): [$CH_2$]/[NHCO]=10.0, polydodecamide (polyamide 12): [$CH_2$]/[NHCO]=11.0, polyhexamethylene dodecamide (polyamide 612): [$CH_2$]/[NHCO]=8.0, polyhexamethylene tetradecamide (polyamide 614): [$CH_2$]/[NHCO]=9.0, polyhexamethylene hexadecamide (polyamide 616): [$CH_2$]/[NHCO]=10.0, polyhexamethylene octadecamide (polyamide 618): [$CH_2$]/[NHCO]=11.0, polyoctamethylene sebacamide (polyamide 810): [$CH_2$]/[NHCO]=8.0, polyoctamethylene dodecamide (polyamide 812): [$CH_2$]/[NHCO]=9.0, polynonamethylene azelamide (polyamide 99): [$CH_2$]/[NHCO]=8.0, polynonamethylene decamide (polyamide 910): [$CH_2$]/[NHCO]=8.5, polynonamethylene dodecamide (polyamide 912): [$CH_2$]/[NHCO]=9.5, polydecamethylene suberamide (polyamide 108): [$CH_2$]/[NHCO]=8.0, polydecamethylene azelamide (polyamide 109): [$CH_2$]/[NHCO]=8.5, polydecamethylene sebacamide (polyamide 1010): [$CH_2$]/[NHCO]=9.0, polydecamethylene dodecamide (polyamide 1012): [$CH_2$]/[NHCO]=10.0, polydodecamethylene adipamide (polyamide 126): [$CH_2$]/[NHCO]=8.0, polydodecamethylene suberamide (polyamide 128): [$CH_2$]/[NHCO]=9.0, polydodecamethylene azelamide (polyamide 129): [$CH_2$]/[NHCO]=9.5, polydodecamethylene sebacamide (polyamide 1210): [$CH_2$]/[NHCO]=10.0, polydodecamethylene dodecamide (polyamide 1212): [$CH_2$]/[NHCO]=11.0 and the like. These can be used one kind or two or more kinds.

Also, as the polyamide copolymer (A1XX) using two or more kinds of only the raw material monomers (constitutional repeating unit) that forms an aliphatic polyamide having the ratio [$CH_2$]/[NHCO] of a number of methylene groups to a number of amide groups of 8.0 or more, there may be mentioned a copolymer using two or more kinds of raw material monomers that forms at least one kind of the homopolymer of the above-mentioned polyamide (MX). These can be used one kind or two or more kinds.

When the polyamide (A1) is a copolymer, the ratio [$CH_2$]/[NHCO] of a number of the methylene groups to a number of the amide groups thereof can be obtained by adding the values multiplying the molar ratio of the constitutional repeating unit in the copolymer to the ratio [$CH_2$]/[NHCO] of a number of the methylene groups to a number of the amide groups in the homopolymer of the monomer constituting the constitutional repeating unit of the copolymer with regard to all the constitutional repeating units.

As the polyamide copolymer (A1XX) using only two or more kinds of the raw material monomers (constitutional repeating unit) that form an aliphatic polyamide having the ratio of a number of methylene groups to a number of amide groups of [$CH_2$]/[NHCO] of 8.0 or more, for example, with regard to the ratio [$CH_2$]/[NHCO] of a number of the methylene groups to a number of the amide groups of the poly(dodecamide/dodecamethylene dodecamide) copolymer (polyamide 12/1212), since the ratios [$CH_2$]/[NHCO] of a number of the methylene groups to a number of the amide groups of the polydodecamide (polyamide 12) and polydodecamethylene dodecamide (polyamide 1212) are 11.0, the ratio [CH$_2$]/[NHCO] of a number of the methylene groups to a number of the amide groups becomes 11.0 irrespective of the molar ratio of the constitutional repeating units.

Further, the ratio [CH$_2$]/[NHCO] of a number of methylene groups to a number of amide groups of the poly(dodecamide/undecamide) copolymer (polyamide 12/11) changes by a molar ratio of the constitutional repeating unit. The ratio [CH$_2$]/[NHCO] of a number of methylene groups to a number of amide groups of the polydodecamide (polyamide 12) is 11.0 and the ratio [CH$_2$]/[NHCO] of a number of methylene groups to a number of amide groups of the polyundecamide (polyamide 11) is 10.0, so that if the molar ratio of the constitutional repeating unit is known, it can be calculated, and when the dodecamide unit/undecaneamide unit of the poly(dodecamide/undecamide) copolymer (polyamide 12/11) is 80:20 (molar ratio), the ratio [CH$_2$]/[NHCO] of a number of methylene groups to a number of amide groups is 11.0×0.80+10.0×0.20=10.8. As the molar ratio of the undecaneamide unit increases, the ratio [CH$_2$]/[NHCO] of a number of methylene groups to a number of amide groups decreases, but at least the ratio [CH$_2$]/[NHCO] of a number of methylene groups to a number of amide groups never fall below 10.0.

Thus, in the polyamide copolymer (A1XX) using only raw material monomers (constitutional repeating units) that forms an aliphatic polyamide having the ratio [CH$_2$]/[NHCO] of a number of methylene groups to a number of amide groups of 8.0 or more like the poly(dodecamide/dodecamethylene dodecamide) copolymer (polyamide 12/1212) and the poly(dodecamide/undecamide) copolymer (polyamide 12/11), its ratio [CH$_2$]/[NHCO] of a number of methylene groups to a number of amide groups is 8.0 or more irrespective of the molar ratio of the constitutional repeating units, whereby it is included in the polyamide (A1) of the present application.

On the other hand, the polyamide (A1) uses a raw material monomer (constitutional repeating unit) that forms an aliphatic polyamide having the ratio [CH$_2$]/[NHCO] of a number of methylene groups to a number of amide groups of 8.0 or more as at least one component, and as mentioned later, and it is also possible to copolymerize it by using at least one component of a raw material monomer (constitutional repeating unit) that forms an aliphatic polyamide having the ratio [CH$_2$]/[NHCO] of a number of methylene groups to a number of amide groups of less than 8.0, and the obtainable polyamide copolymer (A1Y) is included in the polyamide (A1) of the present application as long as it has the ratio [CH$_2$]/[NHCO] of a number of methylene groups to a number of amide groups of 8.0 or more.

As the aliphatic polyamide having the ratio [CH$_2$]/[NHCO] of a number of methylene groups to a number of amide groups of less than 8.0, there may be mentioned polycaproamide (polyamide 6): [CH$_2$]/[NHCO]=5.0, polyethylene adipamide (polyamide 26): [CH$_2$]/[NHCO]=3.0, polytetramethylene succinamide (polyamide 44): [CH$_2$]/[NHCO]=3.0, polytetramethylene glutamide (polyamide 45): [CH$_2$]/[NHCO]=3.5, polytetramethylene adipamide (polyamide 46): [CH$_2$]/[NHCO]=4.0, polytetra-methylene suberamide (polyamide 48): [CH$_2$]/[NHCO]=5.0, polytetramethylene azelamide (polyamide 49): [CH$_2$]/[NHCO]= 5.5, polytetramethylene sebacamide (polyamide 410): [CH$_2$]/[NHCO]=6.0, polytetramethylene dodecamide (polyamide 412): [CH$_2$]/[NHCO]=7.0, polypentamethylene succinamide (polyamide 54): [CH$_2$]/[NHCO]=3.5, polypentamethylene (polyamide 55): [CH$_2$]/[NHCO]=4.0, polypentamethylene adipamide (polyamide 56): [CH$_2$]/[NHCO]=4.5, polypenta-methylene suberamide (polyamide 58): [CH$_2$]/[NHCO]=5.5, polypentamethylene azelamide (polyamide 59): [CH$_2$]/[NHCO]=6.0, polypentamethylene sebacamide (polyamide 510): [CH$_2$]/[NHCO]=6.5, polypentamethylene dodecamide (polyamide 512): [CH$_2$]/[NHCO]= 7.5, polyhexamethylene succinamide (polyamide 64): [CH$_2$]/[NHCO]=4.0, polyhexamethylene glutamide (polyamide 65): [CH$_2$]/[NHCO]=4.5, polyhexamethylene adipamide (polyamide 66): [CH$_2$]/[NHCO]=5.5, polyhexamethylene suberamide (polyamide 68): [CH$_2$]/[NHCO]= 6.0, polyhexamethylene azelamide (polyamide 69): [CH$_2$]/[NHCO]=6.5, polyhexamethylene sebacamide (polyamide 610): [CH$_2$]/[NHCO]=7.0, polynonamethylene adipamide (polyamide 96): [CH$_2$]/[NHCO]=6.5, polynonamethylene suberamide (polyamide 98): [CH$_2$]/[NHCO]=7.5, polydecamethylene glutamide (polyamide 105): [CH$_2$]/[NHCO]=6.5, polydeca-methylene adipamide (polyamide 106): [CH$_2$]/[NHCO]=7.0, polydodecamethylene glutamide (polyamide 125): [CH$_2$]/[NHCO]=7.5, etc. Also, as the aliphatic polyamide having the ratio [CH$_2$]/[NHCO] of a number of methylene groups to a number of amide groups of less than 8.0, there may be mentioned a copolymer using two or more kinds of raw material monomers that form at least one kind of the above-mentioned homopolymer. These can be used one kind or two or more kinds.

The [CH$_2$]/[NHCO] of the polyamide copolymer (A1Y) containing a raw material monomer (constitutional repeating unit) that forms an aliphatic polyamide having the ratio [CH$_2$]/[NHCO] of a number of methylene groups to a number of amide groups of 8.0 or more as at least one component, and using at least one component of a raw material monomer (constitutional repeating unit) that forms an aliphatic polyamide having the ratio [CH$_2$]/[NHCO] of a number of methylene groups to a number of amide groups of less than 8.0 can be obtained as follows. For example, the ratio [CH$_2$]/[NHCO] of a number of methylene groups to a number of amide groups of the poly(dodecamide/caproamide) copolymer (polyamide 12/6) varies by the molar ratio of the constitutional repeating units. The ratio [CH$_2$]/[NHCO] of a number of methylene groups to a number of amide groups of the polydodecamide (polyamide 12) is 11.0, and the ratio [CH$_2$]/[NHCO] of a number of methylene groups to a number of amide groups of the polycaproamide (polyamide 6) is 5.0, so that if the molar ratio of the constitutional repeating units is known, it can be calculated and in the polyamide copolymer in which dodecamide unit/caproamide unit of the poly(dodecamide/caproamide) copolymer (polyamide 12/6) is 50.0:50.0 to 99.5:0.5 (molar ratio), the ratio [CH$_2$]/[NHCO] of a number of methylene groups to a number of amide groups is 8.0 or more. Provided that in order to differentiate the poly(dodecamide/caproamide) copolymer (polyamide 12/6) and the polydodecamide (polyamide 12), when the ratio of the dodecamide unit in the dodecamide unit/caproamide unit of the poly(dodecamide/caproamide) copolymer (polyamide 12/6) is higher than 99.5:0.5 (molar ratio), it is treated to as the polydodecamide (polyamide 12). Hereinafter, the homopolymer and the copolymer are treated in the same manner.

That is, in the polyamide copolymer in which the dodecamide unit/caproamide unit of the poly(dodecamide/caproamide) copolymer (polyamide 12/6) is 50.0:50.0 to 99.5:0.5 (molar ratio), the ratio [CH$_2$]/[NHCO] of a number of methylene groups to a number of amide groups is 8.0 or more, whereby it is included in the polyamide (A1) of the present application.

Thus, the ratio [CH$_2$]/[NHCO] of a number of methylene groups to a number of amide groups in the polyamide copolymer (A1Y) containing a raw material monomer (constitutional repeating unit) that forms an aliphatic polyamide having the ratio [CH$_2$]/[NHCO] of a number of methylene groups to a number of amide groups of 8.0 or more as at least one component, and using at least one component of a raw material monomer (constitutional repeating unit) that forms an aliphatic polyamide having the ratio [CH$_2$]/[NHCO] of a number of methylene groups to a number of amide groups of less than 8.0 can be calculated from the molar ratio of the constitutional repeating units and the ratios [CH$_2$]/[NHCO] of a number of methylene groups to a number of amide groups of the respective the constitutional repeating units, and as long as the ratio [CH$_2$]/[NHCO] of a number of methylene groups to a number of amide groups is 8.0 or more, it is included in the polyamide (A1) of the present application.

Among these, from the viewpoints of sufficiently ensuring various characteristics such as mechanical characteristics, heat resistance, chemical resistance, etc., of the obtainable multilayer, and economy and availability, the polyamide (A1) is more preferably at least one kind of a homopolymer selected from the group consisting of polyundecamide (polyamide 11), polydodecamide (polyamide 12), polyhexamethylene dodecamide (polyamide 612), polyhexamethylene tetradecamide (polyamide 614), polynonamethylene azelamide (polyamide 99), polynonamethylene decamide (polyamide 910), polynonamethylene dodecamide (polyamide 912), polydecamethylene sebacamide (polyamide 1010), polydecamethylene dodecamide (polyamide 1012), and polydodecamethylene dodecamide (polyamide 1212), and/or at least one kind of a copolymer using at least two or more kinds of raw materials that form these homopolymers and the like, and further preferably at least one kind of a homopolymer selected from the group consisting of polyundecamide (polyamide 11), polydodecamide (polyamide 12), polyhexamethylene dodecamide (polyamide 612), polydecamethylene sebacamide (polyamide 1010), polydecamethylene dodecamide (polyamide 1012) and polydodecamethylene dodecamide (polyamide 1212), and/or at least one kind of a copolymer using at least two or more kinds of raw material monomers that form these homopolymers.

Also, from the viewpoint of elution resistance of the monomer and the oligomer, it is particularly preferably at least one kind of a homopolymer selected from the group consisting of polyhexamethylene dodecamide (polyamide 612), polydecamethylene decamide (polyamide 1010) and/or polydecamethylene dodecamide (polyamide 1012), and/or at least one kind of a copolymer using at least two or more kinds of raw material monomers that form these homopolymers.

[Polyamide (A2)]

The polyamide (A2) is an aliphatic polyamide which contains a copolymer containing a unit "a" derived from ε-caprolactam or ε-aminocaproic acid and a unit "b" derived from aminododecanoic acid or ω-laurolactam (hereinafter it is sometimes referred to as polyamide (A2).).

The polyamide (A2) may be a material which contains a copolymer containing a unit "a" derived from ε-caprolactam or ε-aminocaproic acid and a unit "b" derived from aminododecanoic acid or ω-laurolactam, and is an aliphatic polyamide, and is appropriately selected satisfying the above. Incidentally, the polyamide (A2) preferably contains 50% by mass or more of the unit "a" derived from ε-caprolactam or ε-aminocaproic acid.

The aliphatic polyamide (A2) which contains a copolymer containing a unit "a" derived from ε-caprolactam or ε-aminocaproic acid and a unit "b" derived from aminododecanoic acid or ω-laurolactam is preferably a poly(caproamide/dodecamide) copolymer (polyamide 6/12), a poly(caproamide/hexamethylene adipamide/-dodecamide) copolymer (polyamide 6/66/12), a poly(caproamide/hexamethylene sebacamide/dodecamide) copolymer (polyamide 6/610/12), a poly(caproamide/hexamethylene dodecamide/dodecamide) copolymer (polyamide 6/612/12), and a mixture thereof, and more preferably a poly(caproamide/dodecamide) copolymer (polyamide 6/12) and/or a poly(caproamide/hexamethylene adipamide/dodecamide) copolymer (polyamide 6/66/12).

From the viewpoints of availability, economy, sufficiently ensuring various physical properties such as mechanical characteristics, chemical resistance, flexibility, etc., of the obtainable multilayer, and sufficiently obtaining interlayer adhesiveness with the aliphatic polyamide composition (A) and durability thereof, the polyamide (A2) is preferably appropriately selected from the copolymers containing a unit "a" derived from ε-caprolactam or ε-aminocaproic acid and a unit "b" derived from aminododecanoic acid or w-laurolactam so that it satisfies to contain 50% by mass or more of the unit "a" derived from ε-caprolactam or ε-aminocaproic acid.

As a manufacturing apparatus of the polyamide (A1) and polyamide (A2), there may be mentioned conventionally known polyamide producing apparatuses including a batch type reaction tank, a single-tank or multi-tank continuous reaction device, a tubular continuous reaction device, a kneading reaction extruder such as a uniaxial kneading extruder, a twin-screw kneading extruder, etc. As a polymerization method, conventionally known methods such as melt polymerization, solution polymerization, solid phase polymerization, etc., can be used, and polymerization can be carried out by repeating normal pressure, reduced pressure, and pressurizing operations. These polymerization methods can be used alone or optionally in combination.

Relative viscosities of the polyamide (A1) and polyamide (A2) measured under the conditions of 96% sulfuric acid, polymer concentration 1% at 25° C. in accordance with JIS K-6920 are preferably 1.5 or more and 5.0 or less, and more preferably 1.8 or more and 4.5 or less from the viewpoints of ensuring mechanical properties of the obtainable multilayer and ensuring desirable moldability of the multilayer by setting the viscosity at the time of melting in an appropriate range.

When the terminal amino group concentration per 1 g of the polyamide (A1) is made [A1] (μeq/g) and the terminal carboxyl group concentration of the same is made [B1] (μeq/g), from the viewpoint of sufficiently ensuring interlayer adhesiveness and durability thereof of the obtainable multilayer, it is preferable to be [A1]>[B1]+5, more preferable to be [A1]>[B1]+10, and further preferable to be [A1]>[B1]+15. Further, from the viewpoints of melt stability and suppression of generating gel-like substance of the polyamide, it is preferable to be [A1]>20, and more preferably 30<[A1]<120.

Also, when the terminal amino group concentration per 1 g of the polyamide (A2) is made [A2] (μeq/g) and the terminal carboxyl group concentration is made [B2] (μeq/g), from the viewpoints of sufficiently ensuring interlayer adhesiveness and durability thereof of the obtainable multilayer, it is preferable to be [A2]>[B2]+5, more preferable to be [A2]>[B1]+10, and particularly preferable to be [A2]>[B2]+15. Further, from the viewpoints of melt stability of the polyamide and suppression of generating gel-like substance, it is more preferable to be [A2]>20, and further preferable to be 30<[A2]<120.

In the aliphatic polyamide composition (A) containing the polyamide (A1) and polyamide (A2) the aliphatic polyamide, when the terminal amino group concentration per 1 g of the composition (A) is made [A] (µeq/g) and the terminal carboxyl group concentration is made [B] (µeq/g), from the viewpoints of sufficiently obtaining interlayer adhesiveness of the obtainable multilayer and durability thereof, it is more preferable to be [A]>[B]+5, further preferable to be [A]>[B]+10, and particularly preferable to be [A]>[B]+15. Further, from the viewpoints of melt stability of the polyamide and suppression of generating gel-like substance, it is more preferable to be [A]>30, and further preferable to be 30<[A]<120.

Here, the terminal amino group concentration per 1 g of the aliphatic polyamide composition (A) is made [A] (µeq/g) and the terminal carboxyl group concentration of the same is made [B] (µeq/g), and these were made values by multiplying the respective terminal amino group concentrations (µeq/g) and terminal carboxyl group concentrations (µeq/g) of the polyamide (A1) and the polyamide (A2) by the respective mixing mass ratios and adding the both.

Incidentally, the terminal amino group concentration (µeq/g) can be measured by dissolving the polyamide in a phenol/methanol mixed solution and titrating with 0.05N hydrochloric acid. The terminal carboxyl group concentration (µeq/g) can be measured by dissolving the polyamide in benzyl alcohol and titrating with a 0.05N sodium hydroxide solution.

The polyamide (A1) and polyamide (A2) are produced by polymerizing or copolymerizing the above-mentioned polyamide raw material(s) in the presence of an amine(s) by a conventionally known method such as melt polymerization, solution polymerization, solid phase polymerization, etc. Alternatively, it is produced by melt-kneading in the presence of an amine(s) after polymerization. Thus, the amine(s) can be added at any stage during polymerization or at any stage during melt-kneading after polymerization, but when the interlayer adhesiveness of the obtainable multilayer is taken into consideration, it is preferable to add it at the stage during polymerization.

As the above-mentioned amines, there may be mentioned monoamines, diamines, triamines, tetramines and polyamines. Also, in addition to the amines, a carboxylic acid(s) such as monocarboxylic acids, dicarboxylic acids, tricarboxylic acids, etc., may be added, if necessary, as long as they do not out of the above-mentioned range of the terminal group concentration conditions. These amine(s) and carboxylic acid(s) may be added simultaneously or separately. Also, the amine(s) and carboxylic acid(s) exemplified below may be used one kind or two or more kinds.

Specific examples of the monoamine to be added may be mentioned aliphatic monoamines such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicosylamine, docosylamine, etc.; alicyclic monoamines such as cyclohexylamine, methylcyclohexylamine, etc.; aromatic monoamines such as benzylamine, β-phenylmethylamine, etc.; symmetric secondary amines such as N,N-dimethylamine, N,N-diethylamine, N,N-dipropylamine, N,N-dibutylamine, N,N-dihexylamine, N,N-dioctylamine, etc.; hybrid secondary amines such as N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, N-propyl-N-hexadecylamine, N-propyl-N-benzylamine, etc. These can be used one kind or two or more kinds.

Specific examples of the diamine to be added may be mentioned aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine, 5-methyl-1,9-nonanediamine, etc.; alicyclic diamines such as 1,3-bis(aminomethyl)cyclohexane, 1,4-bis(aminomethyl)cyclohexane, bis(4-aminocyclohexyl)methane, 2,2-bis(4-aminocyclo-hexyl)propane, bis(3-methyl-4-aminocyclohexyl)methane, 2,2-bis(3-methyl-4-amino-cyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)-piperazine, 2,5-bis(aminomethyl)norbornane, 2,6-bis(aminomethyl)norbornane, 3,8-bis(aminomethyl)tricyclodecane, 4,9-bis(aminomethyl)tricyclodecane, etc.; aromatic diamines such as m-xylylenediamine, p-xylylenediamine, etc. These can be used one kind or two or more kinds.

Specific examples of the triamine and tetramine to be added may be mentioned 1,2,3-triaminopropane, 1,2,3-triamino-2-methylpropane, 1,2,4-triaminobutane, 1,2,3,4-tetraminobutane, 1,3,5-triaminocyclohexane, 1,2,4-triaminocyclohexane, 1,2,3-triaminocyclohexane, 1,2,4,5-tetraminocyclohexane, 1,3,5-triaminobenzene, 1,2,4-triaminobenzene, 1,2,3-triaminobenzene, 1,2,4,5-tetraminobenzene, 1,2,4-triamino-naphthalene, 2,5,7-triaminonaphthalene, 2,4,6-triaminopyridine, 1,2,7,8-tetramino-naphthalene, 1,4,5,8-tetraminonaphthalene, etc. These can be used one kind or two or more kinds.

The polyamine to be added may be a compound having a plural number of a primary amino group(s) (—NH$_2$) and/or a secondary amino group(s) (—NH—) and, for example, there may be mentioned polyalkyleneimine, polyalkylenepolyamine, polyvinylamine, polyallylamine, etc. These can be used one kind or two or more kinds. The amino group provided with an active hydrogen is a reaction site of the polyamine.

The polyalkyleneimine is produced by the method of ion polymerizing alkyleneimines such as ethyleneimine, propyleneimine, etc., or the method in which alkyl oxazoline is polymerized and then the polymer is partially hydrolyzed or completely hydrolyzed, etc. As the polyalkylenepolyamines, for example, there may be mentioned diethylenetriamine, triethylenetetramine, pentaethylenehexamine, or a reaction product of ethylenediamine and a poly-functional compound, etc. The polyvinylamine is obtained, for example, by polymerizing N-vinylformamide to produce poly(N-vinylformamide), and then, the polymer is partially hydrolyzed or completely hydrolyzed by an acid such as hydrochloric acid, etc. The polyallylamine is, in general, obtained by polymerizing a hydrochloride of an allylamine monomer, and removing hydrochloric acid.

As the polyalkyleneimines, there may be mentioned a homopolymer and/or copolymer obtained by polymerizing one kind or two or more kinds of alkyleneimines having two or more and 8 or less carbon atoms such as ethyleneimine, propyleneimine, 1,2-butyleneimine, 2,3-butyleneimine, 1,1-dimethylethyleneimine, etc., according to the conventional manner. These can be used one kind or two or more kinds. Among these, polyethyleneimine is more preferable. The polyalkyleneimine may be, using an alkyleneimine as a raw material, a branched type polyalkyleneimine containing primary amine, secondary amine and tertiary amine obtained by subjecting to ring-opening polymerization thereof, a linear type polyalkyleneimine containing only primary amine and secondary amine obtained by using an alkyl oxazoline as a raw material and polymerizing the same, or one having a three-dimensionally crosslinked structure. Further, it may be a material containing ethylenediamine, propylenediamine, diethylenetriamine, triethylenetetramine, tetraethylenepentamine, dipropylenetriamine, tripropylenetetramine, dihexamethylenetriamine, aminopropylethylenediamine, bisaminopropylethylenediamine, etc. The polyalkyleneimine generally has a primary amino group and/or a secondary amino group (imino group) having an active hydrogen atom derived from the reactivity of an active hydrogen atom on a nitrogen atom contained therein, in addition to a tertiary amino group.

A number of the nitrogen atoms in the polyalkyleneimine is not particularly limited, and it is preferably 4 or more and 3,000, more preferably 8 or more and 1,500 or less, and further preferably 11 or more and 500 or less. In addition, a number average molecular weight of the polyalkyleneimine is preferably 100 or more and 20,000 or less, more preferably 200 or more and 10,000 or less, and further preferably 500 or more and 8,000 or less.

A used amount of the amines to be added can be appropriately determined according to the conventionally known method in consideration with a terminal amino group concentration, a terminal carboxyl group concentration and a relative viscosity of the polyamide (A1) and polyamide (A2) to be produced. In general, based on 1 mol of the polyamide raw material (1 mol of a monomer or monomer unit constituting the repeating unit), an amount of the amines to be added is preferably 0.5 meq/mol or more and 20 meq/mol or less, and more preferably 1 meq/mol or more and 10 meq/mol or less (the equivalent (eq) of the amino group in which the amount of an amino group that forms an amide group by reacting with a carboxyl group with 1:1 (molar ratio) is defined as 1 equivalent.) from the viewpoints of obtaining sufficient reactivity and making production of the polyamide having a desired viscosity.

In the polyamide (A1) and polyamide (A2), among the above-mentioned exemplary amines, a diamine and/or a polyamine is/are preferably added during polymerization in order to satisfy the conditions of the terminal group concentrations, and from the viewpoint of suppressing generation of gel, it is more preferably to add at least one kind selected from the group consisting of an aliphatic diamine, alicyclic diamine and polyalkyleneimine during polymerization, and it is further preferable to add a polyalkyleneimine during polymerization.

On the other hand, as the carboxylic acids to be added, there may be mentioned aliphatic monocarboxylic acids such as acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleic acid, palmitic acid, stearic acid, oleic acid, linolic acid, arachic acid, behenic acid, erucic acid, etc.; alicyclic monocarboxylic acids such as cyclohexane carboxylic acid, methylcyclohexane carboxylic acid, etc.; aromatic monocarboxylic acids such as benzoic acid, toluic acid, ethylbenzoic acid, phenylacetic acid, etc.; aliphatic dicarboxylic acids such as malonic acid, succinic acid, glutaric acid, adipic acid, pimelic acid, suberic acid, azelaic acid, sebacic acid, undecanedioic acid, dodecanedioic acid, hexadecanedioic acid, hexadecenedioic acid, octadecanedioic acid, octadecenedioic acid, eicosanedioic acid, eicosenedioic acid, docosanedioic acid, diglycolic acid, 2,2,4-trimethyladipic acid, 2,4,4-trimethyladipic acid, etc.; alicyclic dicarboxylic acids such as 1,3-cyclohexanedicarboxylic acid, 1,4-cyclohexanedicarboxylic acid, norbornanedicarboxylic acid, etc.; aromatic dicarboxylic acids such as terephthalic acid, isophthalic acid, phthalic acid, m-xylylenedicarboxylic acid, p-xylylenedicarboxylic acid, 1,4-naphthalenedicarboxylic acid, 2,6-naphthalenedicarboxylic acid, 2,7-naphthalenedicarboxylic acid, etc.;

tricarboxylic acids such as 1,2,4-butanetricarboxylic acid, 1,3,5-pentanetricarboxylic acid, 1,2,6-hexanetricarboxylic acid, 1,3,6-hexanetricarboxylic acid, 1,3,5-cyclohexanetricarboxylic acid, trimesic acid, etc. These can be used one kind or two or more kinds.

[Elastomeric Polymer (A3)]

The aliphatic polyamide composition (A) contains an elastomeric polymer (A3) which may contain a constitutional unit derived from an unsaturated compound having a carboxyl group(s) and/or an acid anhydride group(s) (hereinafter it is sometimes referred to as an elastomeric polymer (A3).).

As the elastomeric polymer (A3), there may be mentioned an (ethylene and/or propylene)/α-olefin-based copolymer, an (ethylene and/or propylene)/(α,β-unsaturated carboxylic acid ester)-based copolymer and an aromatic vinyl compound/conjugated diene compound-based block copolymer, which contains a constitutional unit derived from an unsaturated compound having a carboxyl group(s) and/or an acid anhydride group(s), and an (ethylene and/or propylene)/a-olefin-based copolymer, an (ethylene and/or propylene)/(α,β-unsaturated carboxylic acid ester)-based copolymer and an aromatic vinyl compound/conjugated diene compound-based block copolymer, which do not contain a constitutional unit derived from an unsaturated compound having a carboxyl group(s) and/or an acid anhydride group(s), and these can be used one kind or two or more kinds.

The elastomeric polymer (A3) preferably contains 60% by mass or more of an elastomeric polymer containing a constitutional unit derived from an unsaturated compound having a carboxyl group(s) and/or an acid anhydride group(s) in 100% by mass of the above-mentioned elastomeric polymer (A3), and more preferably 75% by mass or more 95% by mass or less, from the viewpoints of mechanical properties and fluidity.

The above-mentioned (ethylene and/or propylene)/α-olefin-based copolymer is a polymer in which ethylene and/or propylene and an α-olefin having 3 or more carbon atoms are copolymerized, and as the α-olefin having 3 or more carbon atoms, there may be mentioned propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, etc. These can be used one kind or two or more kinds. Also, it may be copolymerized with a polyene of a non-conjugated diene such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, 2-propenyl-2,5-norbornadiene, etc. These can be used one kind or two or more kinds.

The above-mentioned (ethylene and/or propylene)/(α,β-unsaturated carboxylic acid ester)-based copolymer is a polymer in which ethylene and/or propylene and an α,β-unsaturated carboxylic acid ester monomer are copolymerized, and as the α,β-unsaturated carboxylic acid ester monomer, there may be mentioned methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, heptyl acrylate, heptyl methacrylate, octyl acrylate, octyl methacrylate, nonyl acrylate, nonyl methacrylate, decyl acrylate, decyl methacrylate, 2-ethylhexyl acrylate, 2-ethylhexyl methacrylate, hydroxyethyl acrylate, hydroxyethyl methacrylate, monomethyl maleate, monomethyl itaconate, dimethyl maleate, dimethyl itaconate, etc. These can be used one kind or two or more kinds.

Also, the above-mentioned aromatic vinyl compound/conjugated diene compound-based block copolymer is a block copolymer comprising an aromatic vinyl compound-based polymer block and a conjugated diene compound-based polymer block, and a block copolymer having at least one of the aromatic vinyl compound-based polymer block and at least one of the conjugated diene compound-based polymer block is used. In the above-mentioned block copolymer, the unsaturated bond in the conjugated diene compound-based polymer block may be hydrogenated.

The aromatic vinyl compound-based polymer block is a polymer block mainly comprising a unit derived from an aromatic vinyl compound. As the aromatic vinyl compound in such a case, there may be mentioned styrene, o-methylstyrene, m-methylstyrene, p-methylstyrene, 1,5-dimethylstyrene, 2,4-dimethylstyrene, vinylnaphthalene, vinyl anthracene, 4-propylstyrene, 4-cyclohexylstyrene, 4-dodecylstyrene, 2-ethyl-4-benzylstyrene, 4-(phenylbutyl)styrene, etc., and these can be used one kind or two or more kinds. Also, the aromatic vinyl compound-based polymer block may have a small amount of a unit comprising other unsaturated monomers, in some cases.

The conjugated diene compound-based polymer block is a polymer block formed by one or two or more kinds of a conjugated diene-based compound(s) such as 1,3-butadiene, chloroprene, isoprene, 2,3-dimethyl-1,3-butadiene, 1,3-pentadiene, 4-methyl-1,3-pentadiene, 1,3-hexadiene, etc., and in the hydrogenated aromatic vinyl compound/conjugated diene compound-based block copolymer, a part or whole of the unsaturated bond portion(s) of the conjugated diene compound-based polymer block is/are a saturated bond by hydrogenation.

The molecular structure of the aromatic vinyl compound/conjugated diene compound-based block copolymer and its hydrogenated product may be any of linear, branched, radial or any combination thereof. Among these, as the aromatic vinyl compound/conjugated diene compound-based block copolymer and/or its hydrogenated product, one kind or two or more kinds of a diblock copolymer in which one aromatic vinyl compound polymer block and one conjugated diene compound-based polymer block are bonded linearly, a triblock copolymer in which three polymer blocks of the aromatic vinyl compound-based polymer block-the conjugated diene compound-based polymer block-the aromatic vinyl compound-based polymer block are bonded linearly in this order, and hydrogenated products thereof are preferably used, and there may be mentioned a non-hydrogenated or hydrogenated styrene/butadiene block copolymer, a non-hydrogenated or hydrogenated styrene/isoprene block copolymer, a non-hydrogenated or hydrogenated styrene/butadiene/styrene block copolymer, a non-hydrogenated or hydrogenated styrene/isoprene/styrene block copolymer, a non-hydrogenated or hydrogenated styrene/(ethylene/butadiene)/styrene block copolymer, a non-hydrogenated or hydrogenated styrene/(isoprene/butadiene)/styrene block copolymer, etc. These can be used one kind or two or more kinds.

As the unsaturated compound having a carboxyl group which may form a constitutional unit of the elastomeric polymer (A3), there may be mentioned an α,β-unsaturated carboxylic acid such as acrylic acid, methacrylic acid, maleic acid, fumaric acid, itaconic acid, crotonic acid, measaconic acid, citraconic acid, glutaconic acid, cis-4-cyclohexene-1,2-dicarboxylic acid, endo-bicyclo-[2.2.1]-5-heptene-2,3-dicarboxylic acid and a metal salt of these carboxylic acids, etc. These can be used one kind or two or more kinds. As the unsaturated compound having an acid anhydride group which may form a constitutional unit of the elastomeric polymer (A3), a dicarboxylic acid anhydride having an α,β-unsaturated bond such as maleic anhydride, itaconic anhydride, citraconic anhydride, endo-bicyclo-[2.2.1]-5-heptene-2,3-dicarboxylic acid anhydride, etc., may be mentioned. These can be used one kind or two or more kinds. Among these, the dicarboxylic acid anhydride having an α,β-unsaturated bond is preferable, and maleic anhydride and itaconic anhydride are more preferable.

The carboxyl group and/or the acid anhydride group concentration in the elastomeric polymer (A3) is preferably 25 μeq/g or more and 200 μeq/g or less, and more preferably 50 μeq/g or more and 150 μeq/g or less from the viewpoints of sufficiently obtaining an improved effect of low temperature impact resistance, interlayer adhesiveness with an aliphatic polyamide composition (B) mentioned later and durability thereof, and fluidity of the obtainable aliphatic polyamide composition (A).

Incidentally, the carboxyl group and/or the acid anhydride group concentration in the elastomeric polymer (A3) can be measured by dissolving the elastomeric polymer in a toluene solution, using a sample solution prepared by further adding ethanol, and titrating with a 0.1N KOH ethanol solution using phenolphthalein as an indicator.

A content of the polyamide (A1) in the aliphatic polyamide composition (A) is 30% by mass or more and 85% by mass or less based on 100% by mass of the aliphatic polyamide composition (A), preferably 35% by mass or more and 80% by mass or less, and more preferably 40% by mass or more and 70% by mass or less. If the content of the polyamide (A1) is less than the above-mentioned value, mechanical characteristics of the obtainable multilayer are sometimes poor, on the other hand, if it exceeds the above-mentioned value, low temperature impact resistance, interlayer adhesiveness of the obtainable multilayer and durability thereof are sometimes poor.

A content of the polyamide (A2) in the aliphatic polyamide composition (A) is 10% by mass or more and 35% by mass or less based on 100% by mass of the aliphatic polyamide composition (A), preferably 13% by mass or more and 30% by mass or less, and more preferably 15% by mass or more and 27% by mass or less. If the content of the polyamide (A2) is less than the above-mentioned value, interlayer adhesiveness of the obtainable multilayer and durability thereof are sometimes poor, on the other hand, if it exceeds the above-mentioned value, chemical liquid barrier property and chemical resistance of the obtainable multilayer are sometimes poor.

A content of the elastomeric polymer (A3) in the aliphatic polyamide composition (A) is, based on 100% by mass of the aliphatic polyamide composition (A), 5% by mass or more and 30% by mass or less, preferably 7% by mass or more and 27% by mass or less, and more preferably 10% by mass or more and 25% by mass or less. If the content of the elastomeric polymer (A3) is less than the above-mentioned value, low temperature impact resistance, interlayer adhesiveness of the obtainable multilayer, and durability thereof are sometimes poor, on the other hand, if it exceeds the above-mentioned value, mechanical characteristics of the obtainable multilayer and fluidity of the obtainable aliphatic polyamide composition (A) are sometimes poor.

A method of mixing the polyamide (A1), polyamide (A2) and elastomeric polymer (A3) is not particularly limited, and various additives are formulated as necessary, and various kinds of conventionally known methods can be adopted. For example, it can be produced by a method in which pellets of the polyamide (A1), polyamide (A2) and elastomeric polymer (A3) are uniformly dry-blended so as to have the above-mentioned mixing ratio using a tumbler and/or a mixer, a method in which the both are previously dry-blended with the concentrations used at the time of molding together with the other components added as necessary, and melting and kneading, and the like. Melting and kneading can be carried out using a kneader such as a single-screw extruder, a twin-screw extruder, a kneader, a Banbury mixer, etc.

The aliphatic polyamide composition (A) may be a mixture with other thermoplastic resins. A content of the other thermoplastic resin in the aliphatic polyamide composition (A) is preferably 20% by mass or less based on 100% by mass of the aliphatic polyamide composition (A), and more preferably 15% by mass or less.

As the other thermoplastic resins to be mixed, there may be mentioned polyolefin-based resins such as high density polyethylene (HDPE), medium density polyethylene (MDPE), low density polyethylene (LDPE), linear low density polyethylene (LLDPE), ultra-high molecular weight polyethylene (UHMWPE), polypropylene (PP), polybutene (PB), polymethylpentene (TPX), ethylene/vinyl acetate copolymer saponified product (EVOH), etc.; polystyrene-based resins such as polystyrene (PS), syndiotactic polystyrene (SPS), methyl methacrylate/styrene copolymer (MS), methyl methacrylate/styrene/butadiene copolymer (MBS), etc.; the above-mentioned polyolefin-based resins and polystyrene-based resins containing a functional group(s) such as a carboxyl group and a salt thereof, an acid anhydride group, an epoxy group, etc.; polyester-based resins such as polybutylene terephthalate (PBT), polyethylene terephthalate (PET), polyethylene isophthalate (PEI), poly(ethylene terephthalate/ethylene isophthalate) copolymer (PET/PEI), polytrimethylene terephthalate (PTT), polycyclohexanedimethylene terephthalate (PCT), polyethylene naphthalate (PEN), polybutylene naphthalate (PBN), polyarylate (PAR), liquid crystal polyester (LCP), polylactic acid (PLA), polyglycolic acid (PGA), etc.; polyether-based resins such as polyacetal (POM), polyphenylene ether (PPO), etc.; polysulfone-based resins such as polysulfone (PSU), polyethersulfone (PESU), polyphenylsulfone (PPSU), etc.; polythioether-based resins such as polyphenylene sulfide (PPS), polythioether sulfone (PTES), etc.; polyketone-based resins such as polyketone (PK), polyether ketone (PEK), polyether ether ketone (PEEK), polyether ketone ketone (PEKK), polyether ether ether ketone (PEEEK), polyether ether ketone ketone (PEEKK), polyether ketone ketone ketone (PEKKK), polyether ketone ether ketone ketone (PEKEKK), etc.; polynitrile-based resins such as polyacrylonitrile(PAN), polymethacrylonitrile, acrylonitrile/styrene copolymer (AS), methacrylonitrile/styrene copolymer, acrylonitrile/butadiene/styrene copolymer (ABS), acrylonitrile/butadiene copolymer (NBR), etc.; polymethacrylate-based resins such as polymethyl methacrylate (PMMA), polyethyl methacrylate (PEMA), etc.; polyvinyl-based resins such as polyvinyl alcohol (PVA), polyvinylidene chloride (PVDC), polyvinyl chloride (PVC), vinyl chloride/vinylidene chloride copolymer, vinylidene chloride/methyl acrylate copolymer, etc.; cellulose-based resins such as cellulose acetate, cellulose butyrate, etc.; polycarbonate-based resins such as polycarbonate (PC), etc.; polyimide-based resins such as thermoplastic polyimide (TPI), polyether imide, polyester imide, polyamideimide (PAD, polyester amide-imide, etc.; thermoplastic polyurethane-based resins; polyamide elastomer, polyurethane elastomer, polyester elastomer, fluorine-containing polymers such as polyvinylidene fluoride (PVDF), polyvinyl fluoride (PVF), polytetrafluoroethylene (PTFE), polychlorofluoroethylene (PCTFE), tetrafluoro-ethylene/ethylene copolymer (ETFE), ethylene/chlorotrifluoroethylene copolymer (ECTFE), tetrafluoroethylene/hexafluoropropylene copolymer (FEP), tetrafluoro-ethylene/hexafluoropropylene/vinylidene fluoride copolymer (THV), tetrafluoro-ethylene/hexafluoropropylene/vinylidene fluoride/perfluoro(alkyl vinyl ether) copolymer, tetrafluoroethylene/perfluoro(alkyl vinyl ether) copolymer (PFA), tetrafluoroethylene/hexafluoropropylene/perfluoro(alkyl vinyl ether) copolymer, chlorotrifluoroethylene/perfluoro(alkyl vinyl ether)/tetrafluoroethylene copolymer (CPT), etc., and the above-mentioned fluorine-containing polymer containing a functional group(s) having reactivity to an amino group. These can be used one kind or two or more kinds.

Further, to the aliphatic polyamide composition (A), if necessary, an antioxidant, a heat stabilizer, an ultraviolet absorber, a light stabilizer, a lubricant, an inorganic filler, an antistatic agent, a flame retardant, a crystallization accelerator, colorants, etc., may be added.

2. Layer (b)

Layer (b) of the multilayer contains an aliphatic polyamide composition (B). From the viewpoints of heat resistance and mechanical properties, the aliphatic polyamide composition (B) is preferably contained in an amount of 60% by mass or more and 100% by mass or less, and more preferably contained in an amount of 70% by mass or more and 100% by mass or less in Layer (b).

The aliphatic polyamide composition (B) contains the polyamide (B1) and the elastomeric polymer (B2), the polyamide (B1) is an aliphatic polyamide having a ratio of a number of methylene groups to a number of amide groups of less than 8.0, and contained in the above-mentioned polyamide composition (B) in an amount of 55% by mass or more and 95% by mass or less, and the elastomeric polymer (B2) is an elastomeric polymer containing a constitutional unit derived from an unsaturated compound having a carboxyl group(s) and/or an acid anhydride group(s), and contained in the above-mentioned polyamide composition (B) in an amount of 5% by mass or more and 30% by mass or less (hereinafter it is sometimes referred to as aliphatic polyamide composition (B)).

The polyamide (B1) is at least one kind of a homopolymer selected from the group consisting of polycaproamide (polyamide 6), polyhexamethylene adipamide (polyamide 66), polyhexamethylene azelamide (polyamide 69), and polyhexamethylene sebacamide (polyamide 610), and/or at least one kind of a copolymer using two or more kinds of a raw material monomer(s) forming the above.

A producing method and a producing apparatus of the polyamide (B1) are the same as those of the polyamides (A1) and (A2).

A relative viscosity of the polyamide (B1) measured under the conditions of 96% sulfuric acid, the polymer concentration of 1% and at 25° C. in accordance with JIS K-6920 is preferably 1.5 or more and 5.0 or less, and more preferably 1.8 or more and 4.5 or less from the viewpoints of ensuring mechanical properties of the obtainable multilayer and ensuring desirable moldability of the multilayer by setting the viscosity at the time of melting in an appropriate range.

A content of the polyamide (B1) in the aliphatic polyamide composition (B) is 55% by mass or more and 95% by mass or less based on 100% by mass of the aliphatic polyamide composition (B), preferably 60% by mass or more and 93% by mass or less, and more preferably 70% by mass or more and 90% by mass or less. If the content of the aliphatic polyamide (B1) is less than the above-mentioned value, mechanical properties of the obtainable multilayer are sometimes poor, on the other hand, if it exceeds the above-mentioned value, low temperature impact resistance and chemical resistance of the obtainable multilayer tube are sometimes poor.

The aliphatic polyamide composition (B) contains an elastomeric polymer (B2) containing a constitutional unit derived from an unsaturated compound having a carboxyl group(s) and/or an acid anhydride group(s).

As the elastomeric polymer (B2), there may be mentioned an (ethylene and/or propylene)/α-olefin-based copolymer, an (ethylene and/or propylene)/(α,β-unsaturated carboxylic acid ester)-based copolymer and an aromatic vinyl compound/conjugated diene compound-based block copolymer, each of which contain a constitutional unit derived from an unsaturated compound having a carboxyl group(s) and/or an acid anhydride group(s). These can be used one kind or two or more kinds. Examples of these may be mentioned the same as those exemplified as the elastomeric polymer (A3). As the elastomeric polymer (B2), the same material as that of the elastomeric polymer (A3) may be used, or a different material may be used. These can be used one kind or two or more kinds.

A content of the elastomeric polymer (B2) in the aliphatic polyamide composition (B) is 5% by mass or more and 30% by mass or less based on 100% by mass of the aliphatic polyamide composition (B), preferably 7% by mass or more and 25% by mass or less, and more preferably 10% by mass or more and 20% by mass or less. If the content of the elastomeric polymer (B2) is less than the above-mentioned value, low temperature impact resistance, interlayer adhesiveness of the obtainable multilayer and durability thereof are sometimes poor, on the other hand, if it exceeds the above-mentioned value, mechanical characteristics of the obtainable multilayer and fluidity of the obtainable aliphatic polyamide composition (B) are sometimes poor.

A method of mixing the polyamide (B1) and the elastomeric polymer (B2) is mentioned the conventionally known methods described in the explanation of the aliphatic polyamide composition (A).

The aliphatic polyamide composition (B) may contain other thermoplastic resins. As the other thermoplastic resins, the same resins as in the case of the aliphatic polyamide composition (A) are mentioned. These can be used one kind or two or more kinds. A content of the thermoplastic resin in the aliphatic polyamide composition (B) is preferably 20% by mass or less based on 100% by mass of the aliphatic polyamide composition (B), and more preferably 15% by mass or less.

Further, to the aliphatic polyamide composition (B), if necessary, an antioxidant, a heat stabilizer, an ultraviolet absorber, a light stabilizer, a lubricant, an inorganic filler, an antistatic agent, a flame retardant, a crystallization accelerator, a colorant, a lubricant, a plasticizer, etc., may be added.

[Multilayer] An embodiment of the multilayer includes at least two layers of Layer (a) and Layer (b), and at least a pair of Layer (a) and Layer (b) is disposed adjacent to each other.

As the multilayer, there may be mentioned a laminated hollow body, a laminated film and a laminated board.

As the laminated hollow body, there may be mentioned tubes and hoses.

By including Layer (b), low temperature impact resistance of the multilayer after being loaded with environmental stress becomes good. Further, by arranging Layer (a) and Layer (b) adjacent to each other, it is possible to obtain a multilayer excellent in interlayer adhesiveness and durability thereof As a preferred embodiment of the laminated hollow body, it has at least one layer of Layer (b) disposed inside Layer (a). In this case, as long as at least a pair of Layer (a) and Layer (b) are adjacent to each other, Layer (b) disposed inside Layer (a) may be disposed to be adjacent to Layer (a), or another layer may be disposed between Layer (a) and Layer (b). For example, in the case of a three-layer structure including one intermediate layer of Layer (b) between the outermost layer of Layer (a) and the innermost layer of Layer (a), as the adjacent Layer (a) and Layer (b), there are a combination of the outermost layer of Layer (a) and the intermediate layer of Layer (b), and a combination of the innermost layer of Layer (a) and the intermediate layer of Layer (b), and among two combinations, in at least one of them, Layer (b) is disposed inside Layer (a), so that it satisfies the above-mentioned requirement.

As a more preferable embodiment of the laminated hollow body, Layer (a) and Layer (b) are disposed in this order from the outside to the inside of the multilayer. By arranging Layer (a) on the outer layer, it is possible to obtain a multilayer excellent in chemical resistance. By arranging Layer (b) inside, it is possible to suppress dissolution of low molecular weight components such as monomer, oligomer, etc., due to contact with alcohol-containing gasoline.

As a further preferable embodiment of the laminated hollow body, Layer (a), Layer (b) and Layer (a) are disposed in this order from the outside to the inside of the multilayer, and they are adjacent to each other. By arranging Layer (a) in the outer layer and the inner layer, it is possible to obtain a multilayer excellent in chemical resistance and flexibility.

In this layer constitution, from the viewpoints of molding stability and chemical resistance of the multilayer, Layer (a) of the outer layer is preferably 15% or more based on the total layer thickness of the multilayer, and more preferably 20% or more.

Also, in the above-mentioned laminated hollow body, when a conductive layer containing the aliphatic polyamide composition (A) or aliphatic polyamide composition (B) to which a conductive filler is further added is disposed at the innermost layer of the laminated hollow body, it is excellent in impoverished fuel resistance, and when it is used as a fuel piping tube, it is possible to prevent sparks generated by internal friction of the fuel circulating in the pipe or friction with the pipe wall from igniting the fuel. At that time, when a layer containing the aliphatic polyamide composition (A) or aliphatic polyamide composition (B) having no conductivity is disposed at the outside of the above-mentioned conductive layer, both of low temperature impact resistance and conductivity can be accomplished simultaneously and it is also economically advantageous.

Conductivity refers to an electrical characteristic that, for example, when a flammable fluid such as gasoline comes into continuous contact with an insulating material such as a resin, there is a possibility to ignite by accumulating static electricity, and is to have a characteristic that this static electricity does not accumulate. According to this characteristic, it is possible to prevent an explosion due to static electricity generated at the time of transporting a fluid such as a fuel.

The conductive filler includes all fillers to be added to impart conductive property to the resin, and there may be mentioned granular, flake-shaped, fibrous filler, etc.

As the granular filler, there may be mentioned carbon black, graphite, etc. As the flake-shaped filler, there may be mentioned aluminum flake, nickel flake, nickel-coated mica, etc. Also, as the fibrous filler, there may be mentioned metallic fiber such as carbon fiber, carbon-coated ceramic fiber, carbon whisker, carbon nanotubes, aluminum fiber, copper fiber, brass fiber, stainless fiber, etc. These can be used one kind or two or more kinds. Among these, carbon nanotube and carbon black are preferable.

Carbon nanotubes are referred to as hollow carbon fibrils, and the fibrils are essentially columnar fibrils having an outer region consisting of essentially continuous multiple layers of regularly disposed carbon atoms and an inner hollow region, and the respective layers and the hollow region are substantially concentrically disposed around the cylindrical axis of the fibrils. Further, it is preferable that the regularly disposed carbon atoms in the above-mentioned outer region are graphite-like, and a diameter of the above-mentioned hollow region is 2 nm or more and 20 nm or less. An outer diameter of the carbon nanotubes is preferably 3.5 nm or more and 70 nm or less, and more preferably 4 nm or more and 60 nm or less from the viewpoints of imparting sufficient dispersibility into the resin and good conductivity of the obtainable resin molded product. An aspect ratio (ratio of length/outer diameter) of the carbon nanotube is preferably 5 or more, more preferably 100 or more, and further preferably 500 or more. By satisfying the aspect ratio, it is easy to form a conductive network and excellent conductivity can be exhibited with addition of a small amount.

Carbon black includes all carbon blacks that are generally used for imparting conductivity, and as preferable carbon blacks, there may be mentioned acetylene black obtained by incomplete combustion of an acetylene gas, furnace black such as Ketjen black, etc., produced by furnace-type incomplete combustion of crude oil as a raw material, oil black, naphthalene black, thermal black, lamp black, channel black, roll black, disk black, etc., but the invention is not limited to these. These can be used one kind or two or more kinds. Among these, acetylene black and furnace black are more preferable.

Also, with regard to the carbon black, various carbon powders having different characteristics such as its particle diameter, a surface area, a DBP oil absorption amount, an ash content, etc., are produced. There is no limitation on the characteristics of the carbon black, but those having a good chain structure and large aggregation density are preferable. A large amount of formulation of the carbon black is not preferable from the viewpoint of impact resistance, and from the viewpoint of obtaining excellent electrical conductivity with a smaller amount, an average particle diameter is preferably 500 nm or less, more preferably 5 nm or more and 100 nm or less, and further preferably 10 nm or more and 70 nm or less, a surface area (BET method) is preferably 10 $m^2/g$ or more, more preferably 30 $m^2/g$ or more, and further preferably 50 $m^2/g$ or more, and further, a DBP (dibutyl phthalate) oil absorption amount is preferably 50 ml/100 g or more, more preferably 100 ml/100 g, and further preferably 150 ml/100 g or more. An ash content is preferably 0.5% by mass or less, and more preferably 0.3% by mass or less. The DBP oil absorption amount herein mentioned is a value measured by the method specified in ASTM D-2414. In addition, a volatile content of the carbon black is preferably less than 1% by mass.

These conductive fillers may be subjected to surface treatment with a surface treatment agent such as a titanate-based, aluminum-based, silane-based, etc. Further, it is also possible to use granulated products in order to improve workability of melting and kneading.

A content of the conductive filler varies depending on the kind of the conductive filler to be used, so that it cannot be unconditionally specified, but from the viewpoint of balance with conductivity, fluidity, mechanical strength, etc., it is generally preferably 3 parts by mass or more and 30 parts by mass or less based on 100 parts by mass of the aliphatic polyamide composition (A) and aliphatic polyamide composition (B).

Also, such a conductive filler preferably has a surface specific resistance value of the melt extruded product of $10^8$ Ω/square or less, and more preferably $10^6$ Ω/square or less from the viewpoint of obtaining sufficient antistatic property. However, addition of the above-mentioned conductive filler tends to cause deterioration of strength and fluidity. Therefore, if the target conductive level can be obtained, it is desirable that the content of the above-mentioned conductive filler is as small as possible.

In the multilayer, thicknesses of the respective layers are not particularly limited, and can be adjusted depending on the kind of the polymer constituting the respective layers, the total number of the layers in the multilayer, uses, etc., and the thicknesses of the respective layers are determined in consideration of characteristics such as chemical liquid barrier property, low temperature impact resistance, flexibility, etc., of the multilayer. In general, the thicknesses of Layer (a) and Layer (b) are each preferably 3% or more and 90% or less based on the entire thickness of the multilayer.

In consideration of the balance between low temperature impact resistance and chemical liquid barrier property, the thickness of Layer (b) is more preferably 20% or more and 80% or less, and further preferably 30% or more and 70% or less based on the entire thickness of the multilayer.

Also, a number of the total layers in the multilayer is not particularly limited as long as it has at least two layers having Layer (a) and Layer (b). Further, the multilayer may have one layer or two or more layers of a layer(s) containing the other thermoplastic resin(s), in addition to the two layers of Layer (a) and Layer (b), in order to impart further functions or to obtain an economically advantageous multilayer. The number of the layers of the multilayer is two or more layers, and judging from the mechanism of the tube producing apparatus, it is preferably 8 or less layers, and more preferably 3 or more layers and 7 or less layers.

As the thermoplastic resin in the layer containing the other thermoplastic resins in the multilayer, there may be mentioned, other than the polyamide (A1), polyamide (A2) and polyamide (B1), polymeta-xylylene succinamide (polyamide MXD4), polymeta-xylylene glutamide (polyamide MXDS), polymeta-xylylene adipamide (polyamide MXD6), polymeta-xylylene suberamide (polyamide MXD8), polymeta-xylylene azelamide (polyamide MXD9), polymeta-xylylene sebacamide (polyamide MXD10), polymeta-xylylene dodecamide (polyamide MXD12), polymeta-xylylene terephthalamide (polyamide MXDT), polymeta-xylylene isophthalamide (polyamide MXDI), polymeta-xylylene hexahydroterephthalamide (polyamide MXDT(H)), polymeta-xylylenenaphthalamide (polyamide MXDN), polypara-xylylene succinamide (polyamide PXD4), polypara-xylylene glutamide (polyamide PXDS), polypara-xylylene adipamide (polyamide PXD6), polypara-xylylene suberamide (polyamide PXD8), polypara-xylylene azelamide (polyamide PXD9), polypara-xylylene sebacamide (polyamide PXD10), polypara-xylylene dodecamide (polyamide PXD12), polypara-xylylene terephthalamide (polyamide PXDT), polypara-xylylene isophthalamide (polyamide PXDI), polypara-xylylene hexahydroterephthalamide (polyamide PXDT(H)), polypara-xylylene naphthalamide (polyamide PXDN), polypara-phenylene terephthalamide (PPTA), polypara-phenylene isophthalamide (PPIA), polymeta-phenylene terephthalamide (PMTA), polymeta-phenylene isophthalamide (PMIA), poly(2,6-naphthalenedimethylene succinamide) (polyamide 2,6-BAN4), poly(2,6-naphthalenedimethylene glutamide) (polyamide 2,6-BANS), poly(2,6-naphthalenedimethylene adipamide) (polyamide 2,6-BAN6), poly(2,6-naphthalenedimethylene suberamide) (polyamide 2,6-BANS), poly(2,6-naphthalenedimethylene azelamide) (polyamide 2,6-BANS), poly(2,6-naphthalenedimethylene sebacamide) (polyamide 2,6-BAN10), poly(2,6-naphthalenedimethylene dodecamide) (polyamide 2,6-BAN12), poly(2,6-naphthalenedimethylene terephthalamide) (polyamide 2,6-BANT), poly(2,6-naphthalenedimethylene isophthalamide) (polyamide 2,6-BANI), poly(2,6-naphthalenedimethylene hexahydroterephthalamide) (polyamide 2,6-BANT(H)), poly(2,6-naphthalenedimethylene naphthalamide) (polyamide 2,6-BANN), poly(2,5-furandimethylene succinamide) (polyamide 2,5-F4), poly(2,5-furandimethylene glutamide) (polyamide 2,5-F5), poly(2,5-furandimethylene adipamide) (polyamide 2,5-F6), poly(2,5-furandimethylene suberamide) (polyamide 2,5-F8), poly(2,5-furandimethylene azelamide) (polyamide 2,5-F9), poly(2,5-furandimethylene sebacamide) (polyamide 2,5-F10), poly(2,5-furandimethylene dodecamide) (polyamide 2,5-F12), poly(2,5-furandimethylene terephthalamide) (polyamide 2,5-FT), poly(2,5-furandimethylene isophthalamide) (polyamide 2,5-FI), poly(2,5-furandimethylene hexahydroterephthalamide) (polyamide 2,5-FT(H)), poly(2,5-furandimethylene naphthalamide) (polyamide 2,5-FN), poly(l,3-cyclohexanedimethylene adipamide) (polyamide 1,3-BAC6), poly(l,3-cyclohexanedimethylene suberamide (polyamide 1,3-BAC8), poly(1,3-cyclohexanedimethylene azelamide) (polyamide 1,3-BAC9), poly(1,3-cyclohexanedimethylene sebacamide) (polyamide 1,3-BAC10), poly(1,3-cyclohexane-dimethylene dodecamide) (polyamide 1,3-BAC12), poly(1,3-cyclohexanedimethylene terephthalamide) (polyamide 1,3-BACT), poly(1,3-cyclohexanedimethylene isophthalamide) (polyamide 1,3-BALI), poly(1,3-cyclohexanedimethylene hexahydroterephthalamide) (polyamide 1,3-BACT(H)), poly(1,3-cyclohexanedimethylene naphthalamide) (polyamide 1,3-BACN), poly(1,4-cyclohexanedimethylene adipamide) (polyamide 1,4-BAC6), poly(1,4-cyclohexanedimethylene suberamide) (polyamide 1,4-BAC8), poly(1,4-cyclohexane-dimethylene azelamide) (polyamide 1,4-BAC9), poly(1,4-cyclohexanedimethylene sebacamide) (polyamide 1,4-BAC10), poly(1,4-cyclohexanedimethylene dodecamide) (polyamide 1,4-BAC12), poly(1,4-cyclohexanedimethylene terephthalamide) (polyamide 1,4-BACT), poly(1,4-cyclohexanedimethylene isophthalamide) (polyamide 1,4-BALI), poly(1,4-cyclohexanedimethylene hexahydroterephthalamide) (polyamide 1,4-BACT(H)), poly(1,4-cyclohexanedimethylene naphthalamide) (polyamide 1,4-BACN), poly(4,4'-methylenebiscyclohexylene adipamide) (polyamide PACM6), poly(4,4'-methylenebiscyclohexylene suberamide) (polyamide PACM8), poly(4,4'-methylenebiscyclohexylene azelamide) (polyamide PACM9), poly(4,4'-methylenebiscyclohexylene sebacamide) (polyamide PACM10), poly(4,4'-methylenebiscyclohexylene dodecamide) (polyamide PACM12), poly(4,4'-methylene-biscyclohexylene tetradecamide) (polyamide PACM14), poly(4,4'-methylenebiscyclo-hexylene hexadecamide) (polyamide PACM16), poly(4,4'-methylenebiscyclohexylene octadecamide) (polyamide PACM18), poly(4,4'-methylenebiscyclohexylene terephthalamide) (polyamide PACMT), poly(4,4'-methylenebiscyclohexylene isophthalamide) (polyamide PACMI), poly(4,4'-methylenebiscyclohexylene hexahydroterephthalamide) (polyamide PACMT(H)), poly(4,4'-methylenebiscyclo-hexylene naphthalamide) (polyamide PACMN), poly(4,4'-methylenebis(2-methyl-cyclohexylene)adipamide) (polyamide MACM6), poly(4,4'-methylenebis(2-methyl-cyclohexylene)suberamide) (polyamide MACM8), poly(4,4'-methylenebis(2-methyl-cyclohexylene)azelamide) (polyamide MACM9), poly(4,4'-methylenebis(2-methyl-cyclohexylene)sebacamide) (polyamide MACM10), poly(4,4'-methylenebis(2-methyl-cyclohexylene)dodecamide) (polyamide MACM12), poly(4,4'-methylenebis(2-methyl-cyclohexylene)tetradecamide) (polyamide MACM14), poly(4,4'-methylenebis(2-methyl-cyclohexylene)hexadecamide) (polyamide MACM16), poly(4,4'-methylenebis(2-methyl-cyclohexylene)octadecamide) (polyamide MACM18), poly(4,4'-methylenebis(2-methyl-cyclohexylene) terephthalamide) (polyamide MACMT), poly(4,4'-methylenebis(2-methyl-cyclohexylene) isophthalamide) (polyamide MACMI), poly(4,4'-methylenebis(2-methyl-cyclohexylene) hexahydroterephthalamide) (polyamide MACMT(H)), poly(4,4'-methylenebis(2-methyl-cyclohexylene) naphthalamide) (polyamide MACMN), poly(4,4'-propylenebiscyclohexylene adipamide) (polyamide PACP6), poly(4,4'-propylenebiscyclohexylene suberamide) (polyamide PACP8), poly(4,4'-propylenebiscyclohexylene azelamide) (polyamide PACP9), poly(4,4'-propylene-biscyclohexylene sebacamide) (polyamide PACP10), poly(4,4'-propylenebiscyclohexylene dodecamide) (polyamide PACP12), poly(4,4'-propylenebiscyclohexylene tetradecamide) (polyamide PACP14), poly(4,4'-propylenebiscyclohexylene hexadecamide) (polyamide PACP16), poly(4,4'-propylenebiscyclohexylene octadecamide) (polyamide PACP18), poly(4,4'-propylenebiscyclohexylene terephthalamide) (polyamide PACPT), poly(4,4'-propylenebiscyclohexylene isophthalamide) (polyamide PACPI), poly(4,4'-propylenebiscyclohexylene hexahydroterephthalamide) (polyamide PACPT(H)), poly(4,4'-propylenebiscyclohexylene naphthalamide) (polyamide PACPN), polyisophorone adipamide (polyamide IPD6), polyisophorone suberamide (polyamide IPD8), polyisophorone azelamide (polyamide IPD9), polyisophorone sebacamide (polyamide IPD10), polyisophorone dodecamide (polyamide IPD12), polyisophorone terephthalamide (polyamide IPDT), polyisophorone isophthalamide (polyamide IPDI), polyisophorone hexahydroterephthalamide (polyamide IPDT(H)), polyisophorone naphthalamide (polyamide IPDN), poly(2,5-tetrahydrofurandimethylene succinamide) (polyamide 2,5-F(H)4), poly(2,5-tetrahydrofurandimethylene glutamide) (polyamide 2,5-F(H)5), poly(2,5-tetrahydrofurandimethylene adipamide) (polyamide 2,5-F(H)6), poly(2,5-tetrahydrofurandimethylene suberamide) (polyamide 2,5-F(H)8), poly(2,5-tetrahydro-furandimethylene azelamide) (polyamide 2,5-F(H)9), poly(2,5-tetrahydrofurandimethyl-enesebacamide) (polyamide 2,5-F(H)10), poly(2,5-tetrahydrofurandimethylene dodecamide) (polyamide 2,5-F(H)12), poly(2,5-tetrahydrofurandimethylene terephthalamide) (polyamide 2,5-F(H)T), poly(2,5-tetrahydrofurandimethylene isophthalamide) (polyamide 2,5-F(H)I), poly(2,5-tetrahydrofurandimethylene hexahydroterephthalamide) (polyamide 2,5-F(H)T(H)), poly(2,5-tetrahydrofurandimethylene naphthalamide) (polyamide 2,5-F(H)N), polytetramethylene terephthal-amide (polyamide 4T), polytetramethylene isophthalamide (polyamide 4I), polytetramethylene naphthalamide (polyamide 4N), polytetramethylene hexahydro-terephthalamide (polyamide 4T(H)), polypentamethylene terephthalamide (polyamide 5T), polypentamethylene isophthalamide (polyamide 5O, polypentamethylene naphthalamide (polyamide 5N), polypentamethylene hexahydroterephthalamide (polyamide 5T(H)), polyhexamethylene terephthalamide (polyamide 6T), polyhexamethylene isophthalamide (polyamide 6I), polyhexamethylene naphthalamide (polyamide 6N), polyhexamethylene hexahydroterephthalamide (polyamide 6T(H)), poly(2-methylpentamethylene terephthalamide) (polyamide M5T), poly(2-methyl-pentamethylene isophthalamide) (polyamide M5I), poly(2-methylpentamethylene naphthalamide (polyamide M5N), poly(2-methylpentamethylene hexahydroterephthalamide) (polyamide M5T(H)), polynonamethylene terephthalamide (polyamide 9T), polynonamethylene isophthalamide (polyamide 9I), polynonamethylene naphthalamide (polyamide 9N), polynonamethylene hexahydroterephthalamide (polyamide 9T(H)), poly(2-methyloctamethylene terephthalamide) (polyamide M8T), poly(2-methyloctamethylene isophthalamide) (polyamide M8I), poly(2-methyloctamethylene naphthalamide) (polyamide M8N), poly(2-methyloctamethylene hexahydroterephthalamide) (polyamide M8T(H)), polytrimethylhexamethylene terephthalamide (polyamide TMHT), polytrimethylhexamethylene isophthalamide (polyamide TMHI), polytrimethylhexamethylene naphthalamide (polyamide TMHN), polytrimethylhexamethylene hexahydroterephthalamide (polyamide TMHT(H)), polydecamethylene terephthalamide (polyamide 10T), polydecamethylene isophthalamide (polyamide 10I), polydecamethylene naphthalamide (polyamide 10N), polydecamethylene hexahydroterephthalamide (polyamide 10T(H)), polyundecamethylene terephthalamide (polyamide 11T), polyundecamethylene isophthalamide (polyamide 11I), polyundecamethylene naphthalamide (polyamide 11N), polyundecamethylene hexahydroterephthalamide (polyamide 11T(H)), polydodecamethylene terephthalamide (polyamide 12T), polydodecamethylene isophthalamide (polyamide 12I), polydodecamethylene naphthalamide (polyamide 12N), polydodecamethylene hexahydroterephthalamide (polyamide 12T(H)), poly(tetramethylene-2,5-furan-dicarboxyamide) (polyamide 4F), poly(pentamethylene-2,5-furandicarboxyamide) (polyamide 5F), poly(hexamethylene-2,5-furandicarboxyamide) (polyamide 6F), poly(2-methylpentamethylene-2,5-furandicarboxyamide) (polyamide M5F), poly(nonamethylene-2,5-furandicarboxyamide) (polyamide 9F), poly(2-methyloctamethylene-2,5-furandicarboxyamide) (polyamide M8F), poly(trimethylhexamethylene-2,5-furandicarboxyamide) (polyamide TMHF), poly(decamethylene-2,5-furan-dicarboxyamide) (polyamide 10F), poly(undecamethylene-2,5-furandicarboxyamide) (polyamide 11F), poly(dodecamethylene-2,5-furandicarboxyamide) (polyamide 12F), poly(tetramethylene-2,5-tetrahydrofuran dicarboxyamide) (polyamide 4F(H)), poly(pentamethylene-2,5-tetrahydrofuran dicarboxyamide) (polyamide 5F(H)), poly(hexamethylene-2,5-tetrahydrofuran dicarboxyamide) (polyamide 6F(H)), poly(2-methylpentamethylene-2,5-tetrahydrofuran dicarboxyamide) (polyamide M5F(H)), poly(nonamethylene-2,5-tetrahydrofuran dicarboxyamide) (polyamide 9F(H)), poly(2-methyloctamethylene-2,5-tetrahydrofuran dicarboxyamide) (polyamide M8F(H)), poly(trimethylhexamethylene-2,5-tetrahydrofuran dicarboxyamide) (polyamide TMHF(H)), poly(decamethylene-2,5-tetrahydrofuran dicarboxyamide) (polyamide 10F(H)), poly(undecamethylene-2,5-tetrahydrofuran dicarboxyamide) (polyamide 11F(H)), poly(dodecamethylene-2,5-tetrahydrofuran dicarboxyamide) (polyamide 12F(H)), and a copolymer, etc., using two or more kinds of a raw material monomer(s) of these polyamides and/or a raw material monomer(s) of homoplymers selected from the group of the above-mentioned polyamide (A1), polyamide (A2), and polyamide (B1). These can be used one kind or two or more kinds.

Also, there may be mentioned a fluorine-containing polymer such as polyvinylidene fluoride (PVDF), polyvinyl fluoride (PVF), polytetrafluoroethylene (PTFE), polychlorotrifluoroethylene(PCTFE), tetrafluoroethylene/perfluoro(alkyl vinyl ether) copolymer (PFA), tetrafluoroethylene/hexafluoropropylene copolymer (FEP), tetrafluoroethylene/perfluoro(alkyl vinyl ether)/hexafluoropropylene copolymer, ethylene/tetrafluoroethylene copolymer (ETFE), ethylene/tetrafluoroethylene/hexafluoropropylene copolymer (EFEP), vinylidene fluoride/tetrafluoroethylene copolymer, vinylidene fluoride/hexafluoropropylene copolymer, vinylidene fluoride/perfluoro(alkyl vinyl ether) copolymer, tetrafluoroethylene/hexafluoropropylene/vinylidene fluoride copolymer (THV), vinylidene fluoride/perfluoro(alkyl vinyl ether)/tetrafluoroethylene copolymer, tetrafluoroethylene/hexafluoropropylene/vinylidene fluoride/perfluoro(alkyl vinyl ether) copolymer, ethylene/chlorotrifluoroethylene copolymer (ECTFE), chlorotrifluoroethylene/tetrafluoroethylene copolymer, vinylidene fluoride/chlorotrifluoroethylene copolymer, chlorotrifluoroethylene/perfluoro(alkyl vinyl ether) copolymer, chlorotrifluoroethylene/hexafluoropropylene copolymer, chlorotrifluoroethylene/tetrafluoroethylene/hexafluoropropylene copolymer, chlorotrifluoroethylene/-tetrafluoroethylene/vinylidene fluoride copolymer, chlorotrifluoroethylene/perfluoro-(alkyl vinyl ether)/tetrafluoroethylene copolymer (CPT), chlorotrifluoroethylene/-perfluoro(alkyl vinyl ether)/hexafluoropropylene copolymer, chlorotrifluoroethylene/-tetrafluoroethylene/hexafluoropropylene/perfluoro(alkyl vinyl ether) copolymer, chlorotrifluoroethylene/tetrafluoroethylene/vinylidene fluoride/perfluoro(alkyl vinyl ether) copolymer, chlorotrifluoroethylene/tetrafluoroethylene/vinylidene fluoride/-hexafluoropropylene copolymer, chlorotrifluoroethylene/tetrafluoroethylene/vinylidene fluoride/perfluoro(alkyl vinyl ether)/hexafluoropropylene copolymer, etc., and the above-mentioned fluorine-containing polymer containing a functional group(s) having reactivity to an amino group. These can be used one kind or two or more kinds.

Further, there may be mentioned polyolefin-based resins such as high density polyethylene (HDPE), medium density polyethylene (MDPE), low density polyethylene (LDPE), linear low density polyethylene (LLDPE), ultra-high molecular weight polyethylene (UHMWPE), polypropylene (PP), polybutene (PB), polymethylpentene (TPX), ethylene/propylene copolymer (EPR), ethylene/butene copolymer (EBR), ethylene/vinyl acetate copolymer (EVA), ethylene/acrylic acid copolymer (EAA), ethylene/methacrylic acid copolymer (EMAA), ethylene/methyl acrylate copolymer (EMA), ethylene/methyl methacrylate copolymer (EMMA), ethylene/ethyl acrylate copolymer (EEA), ethylene/vinyl acetate copolymer saponified product (EVOH), etc.; polystyrene-based resins such as polystyrene(PS), syndiotactic polystyrene (SPS), methyl methacrylate/styrene copolymer (MS), methyl methacrylate/styrene/butadiene copolymer (MBS), styrene/butadiene copolymer (SBR), styrene/isoprene copolymer (SIR), styrene/isoprene/butadiene copolymer (SIBR), styrene/butadiene/styrene copolymer (SBS), styrene/isoprene/styrene copolymer (SIS), styrene/ethylene/-butylene/styrene copolymer (SEBS), styrene/ethylene/propylene/styrene copolymer (SEPS), etc.; the above-mentioned polyolefin-based resins and polystyrene-based resins containing a functional group(s) including a carboxyl group such as acrylic acid, methacrylic acid, maleic acid, fumaric acid, itaconic acid, crotonic acid, measaconic acid, citraconic acid, glutaconic acid, cis-4-cyclohexene-1,2-dicarboxylic acid, endo-bicyclo-[2.2.1]-5-heptene-2,3-dicarboxylic acid, etc., and a metal salt (Na, Zn, K, Ca, Mg) thereof, an acid anhydride group such as maleic anhydride, itaconic anhydride, citraconic anhydride, endo-bicyclo-[2.2.1]-5-heptene-2,3-dicarboxylic acid anhydride, etc.; an epoxy group such as glycidyl acrylate, glycidyl methacrylate, glycidyl ethacrylate, glycidyl itaconate, glycidyl citraconate, etc., polyester-based resins such as polybutylene terephthalate (PBT), polyethylene terephthalate (PET), polyethylene isophthalate (PEI), poly(ethylene terephthalate/ethylene isophthalate) copolymer (PET/PEI), polytrimethylene terephthalate (PTT), polycyclohexanedimethylene terephthalate (PCT), polyethylene naphthalate (PEN), polybutylene naphthalate (PBN), polyarylate (PAR), liquid crystal polyester (LCP), polylactic acid (PLA), polyglycolic acid (PGA), etc.; polyether-based resins such as polyacetal (POM), polyphenylene ether (PPO), etc.; polysulfone-based resins such as polysulfone (PSU), polyethersulfone (PESU), polyphenylsulfone (PPSU), etc.; polythioether-based resins such as polyphenylene sulfide (PPS), polythioether sulfone (PTES), etc.; polyketone-based resins such as polyketone (PK), polyether ketone (PEK), polyether ether ketone (PEEK), polyether ketone ketone (PEKK), polyether ether ketone (PEEEK), polyether ether ketone ketone (PEEKK), polyether ketone ketone ketone (PEKKK), polyether ketone ether ketone ketone (PEKEKK), etc.; polynitrile-based resins such as polyacrylonitrile (PAN), polymethacrylonitrile, acrylonitrile/styrene copolymer (AS), methacrylonitrile/styrene copolymer, acrylonitrile/butadiene/styrene copolymer (ABS), acrylonitrile/butadiene copolymer (NBR), etc.; polymethacrylate-based resins such as polymethyl methacrylate (PMMA), polyethyl methacrylate (PEMA), etc.; polyvinyl ester-based resins such as polyvinyl acetate (PVAc), etc.; polyvinyl chloride-based resins such as polyvinylidene chloride (PVDC), polyvinyl chloride (PVC), vinyl chloride/vinylidene chloride copolymer, vinylidene chloride/methyl acrylate copolymer, etc.; cellulose-based resins such as cellulose acetate, cellulose butyrate, etc.; polycarbonate-based resins such as polycarbonate (PC), etc.; polyimide-based resins such as thermoplastic polyimide (TPI), polyether imide, polyester imide, polyamide-imide (PAD, polyester amide-imide, etc.; thermoplastic polyurethane-based resins;

polyamide elastomers, polyurethane elastomers, polyester elastomers, etc. These can be used one kind or two or more kinds.

Incidentally, in the multilayer, from the viewpoints of melt stability and molding stability, among the above-mentioned exemplary thermoplastic resins, it is preferable to use polyester-based resins, polyamide-based resins, polythioether-based resins, polyolefin-based resins and fluorine-containing polymers each having a melting point of 290° C. or lower.

Also, it is possible to multilayer any base material other than the thermoplastic resin, for example, paper, metal-based material, non-stretched, uniaxially stretched or biaxially stretched plastic film or sheet, woven fabric, non-woven fabric, metal cotton, wood, etc. As the metal-based material, there may be mentioned metals such as aluminum, iron, copper, nickel, gold, silver, titanium, molybdenum, magnesium, manganese, lead, tin, chromium, beryllium, tungsten, cobalt, etc., metal compound, and alloy steel such as stainless steel, etc., comprising two or more kinds thereof, aluminum alloy, copper alloys such as brass, bronze, etc., alloys such as nickel alloy, etc. These can be used one kind or two or more kinds.

As a method for producing a multilayer, there may be mentioned a method (coextrusion molding method) of melt extrusion using an extruder corresponding to a number of layers or a number of materials, and simultaneously laminating inside or outside the die, or a method (coating method) in which once a single-layer tube or the multilayer produced by the above-mentioned method is previously produced, resins are integrated and laminated on the outside in sequence, if necessary, using an adhesive.

The multilayer is preferably produced by a coextrusion molding method in which various materials are coextruded in a molten state, and both are heat-sealed (melt-bonded) to produce a tube having a laminated structure in one step. That is, the method for producing the multilayer preferably contains to carry out coextrusion molding.

Also, when the obtainable multilayer has a complicated shape, or when the molded product is produced by subjecting to heat bending after molding, in order to remove the residual strain of the molded product, after forming the above-mentioned multilayer, it is also possible to obtain a desired molded product by subjecting to heat treatment at a temperature lower than the lowest melting point among the melting points of the resins constituting the above-mentioned tube for 0.01 hour or longer and 10 hours or shorter.

In the multilayer, it may have a corrugated region. The corrugated region is a region formed in a corrugated shape, a bellows shape, an accordion shape, a corrugated shape, etc. The corrugated region is not limited to have the entire length of the multilayer, but may be partially provided in an appropriate region in the middle. The corrugated region can be easily formed by first molding a straight tubular multilayer and then molding it to obtain a predetermined corrugated shape or the like. By having such a corrugated region, it has shock absorbing property and is easy to attach. Further, for example, it is possible to form an L-shape, a U-shape, etc., by adding necessary parts such as a connector, etc., or subjecting to bending.

To all or part of the outer circumference of the multilayer formed in this way, in consideration of stone splash, wear with other parts and flame resistance, there may be disposed a solid or sponge-like protective member (protector) constituted by natural rubber (NR), butadiene rubber (BR), isoprene rubber (IR), butyl rubber (IIR), chloroprene rubber (CR), carboxylated butadiene rubber (XBR), carboxylated chloroprene rubber (XCR), epichlorohydrin rubber (ECO), acrylonitrile-butadiene rubber (NBR), hydrogenated acrylonitrile-butadiene rubber (HNBR), carboxylated acrylonitrile-butadiene rubber (XNBR), a mixture of NBR and polyvinyl chloride, acrylonitrile-isoprene rubber (NIR), chlorinated polyethylene rubber (CM), chlorosulfonated polyethylene rubber (CSM), ethylene-propylene rubber (EPR), ethylene-propylene-diene rubber (EPDM), ethylene vinyl acetate rubber (EVM), mixed rubber of NBR and EPDM, acrylic rubber (ACM), ethylene acrylic rubber (AEM), acrylate butadiene rubber (ABR), styrene-butadiene rubber (SBR), carboxylated styrene-butadiene rubber (XSBR), styrene-isoprene rubber (SIR), styrene-isoprene-butadiene rubber (SIBR), urethane rubber, silicone rubber (MQ, VMQ), fluorine rubber (FKM, FFKM), fluorosilicone rubber (FVMQ), thermoplastic elastomers such as vinyl chloride-based, olefin-based, ester-based, urethane-based, amide-based, etc. The protective member may be a sponge-like porous body by a known manner. By making it a porous body, it is possible to form a protective portion having lightweight and excellent in heat insulating properties. In addition, the material cost can be reduced. Alternatively, glass fiber, etc., may be added to improve its strength. A shape of the protective member is not particularly limited, and usually, it is a block-shaped member having a recess for receiving a multilayer tube, which is one embodiment of a tubular member or a multilayer. In the case of a tubular member, the multilayer tube can be inserted into the previously prepared tubular member later, or the tubular member can be coated and extruded on the multilayer tube to make them in close contact with each other. In order to bond the both members, an adhesive is applied to the inner surface of the protective member or the above-mentioned concave surface as necessary, a multilayer tube is inserted or fitted therein, and the both members are brought into close contact to form a structure in which the multilayer tube and the protective member are integrated. It is also possible to reinforce with metal, etc.

The outer diameter of the multilayer tube is designed to have such a thickness that, in consideration of a flow amount of the chemical solution (for example, fuel such as alcohol-containing gasoline, etc.), etc., permeability of the chemical solution does not increase and a breaking pressure of a normal tube can be maintained, and flexibility with the extent that easiness of assembling operation of the tube and vibration resistance at the time of use can be maintained, but it is not limited. It is preferable that the outer diameter is 4 mm or more and 300 mm or less, the inner diameter is 3 mm or more and 250 mm or less, and the wall thickness is 0.5 mm or more and 25 mm or less.

The multilayer of the present embodiment is capable of using various kinds of uses including mechanical parts such as automobile parts, internal combustion engine applications, power tool housings, etc., and also industrial materials, industrial materials, electrical and electronic parts, medical use, foods, household and office supplies, building material-related parts, parts for furniture, etc.

Also, the multilayer is suitable for a chemical solution and/or gas transport tube. As the chemical solution, there may be mentioned, for example, aromatic hydrocarbon solvents such as benzene, toluene, xylene, alkyl benzene, etc.; alcohols such as methanol, ethanol, propanol, butanol, pentanol, ethylene glycol, propylene glycol, diethylene glycol, phenol, cresol, polyethylene glycol, polypropylene glycol, polyalkylene glycol, etc.; phenol solvent; ether solvents such as dimethyl ether, dipropyl ether, methyl-t-butyl ether, ethyl-t-butyl ether, dioxane, tetrahydrofuran, polyol esters, polyvinyl ethers, etc.; ketone solvents such as acetone, methyl ethyl ketone, diethyl ketone, acetophenone, etc.; mineral oils, silicone oils, natural paraffins, naphthenes, synthetic paraffins, polyalphaolefins, etc., gasoline, kerosene, diesel gasoline, rapeseed oil methyl ester, soybean oil methyl ester, palm oil methyl ester, coconut oil methyl ester, gas liquefied oil (Gas To Liquid: GTL), coal liquefied oil (Coal To Liquid: CTL), biomass liquefied oil (Biomass To Liquid: BTL), alcohol-containing gasoline, ethyl-t-butyl ether blended oxygen-containing gasoline, amine-containing gasoline, sour gasoline, compressed natural gas (CNG), liquefied petroleum gas (LPG), liquefied hydrocarbon gas (LHG), liquefied natural gas (LNG), dimethyl ether for fuel (DME), castor oil base brake liquid, glycol ether-based brake liquid, boric acid ester-based brake liquid, brake liquid for frigid region, silicone oil-based brake liquid, mineral oil-based brake liquid, power steering oil, hydrogen sulfide-containing oil, window washer fluid, engine coolant, urea solution, pharmaceutical agents, inks, paints, etc.

As the gas, there may be mentioned hydrogen, helium, argon, xenon, krypton, neon, fluorine, chlorine, bromine, iodine, carbon monoxide, carbon dioxide, hydrogen sulfide, carbonyl sulfide, sulfur oxide (SOx), nitrogen oxide (NOx), oxygen, ozone, nitrogen, air, ammonia, hydrocarbons such as methane, ethane, propane, isobutane, n-butane, etc.; unsaturated hydrocarbons such as acetylene, ethylene, propylene, 1-butene, 2-butene, isobutene, styrene and butadiene, etc.; halo-olefins such as HFC-23 (trifluoromethane), HFC-32 (difluoromethane), HFC-41 (fluoromethane), HFC-123 (2,2-dichloro-1,1,1-trifluoroethane), HFC-125 (1,1,1,2,2-pentafluoroethane), HFC-134 (1,1,2,2-tetrafluoroethane), HFC-134a (1,1,1,2-tetrafluoroethane), HFC-143 (1,1,2-trifluoroethane), HFC-143a (1,1,1-trifluoroethane), HFC-152 (1,2-difluoroethane), HFC-152a (1,1-difluoroethane), HFC-161 (fluoroethane), HFC-227ea (1,1,1,2,3,3,3-heptafluoropropane), HFC-227ca (1,1,2,2,3,3,3-heptafluoropropane), HFC-236fa (1,1,1,3,3,3-hexafluoropropane), HFC-236ea (1,1,1,2,3,3-hexafluoropropane), HFC-236cb (1,1,1,2,2,3-hexafluoropropane), HFC-236ca (1,1,2,2,3,3-hexafluoropropane), HFC-245ca (1,1,2,2,3-pentafluoropropane), HFC-245ea (1,1,2,3,3-pentafluoropropane), HFC-245eb (1,1,1,2,3-pentafluoropropane), HFC-245fa (1,1,1,3,3-pentafluoropropane), HFC-245cb (1,1,1,2,2-pentafluoropropane), HFC-254eb (1,1,1,2-tetrafluoropropane), HFC-254eb (1,1,2,2-tetrafluoropropane), HFC-254ca (1,2,2,3-tetrafluoropropane), HFC-263fb (1,1,1-trifluoropropane), HFC-263ca (1,2,2-trifluoropropane), HFC-272fb (1,1-difluoropropane), HFC-272ea (1,2-difluoropropane), HFC-272fa (1,3-difluoro-propane), HFC-272ca (2,2-difluoropropane), HFC-281fa (1-fluoropropane), HFC-281ea (2-fluoropropane), HFC-329p (1,1,1,2,2,3,3,4,4-nonafluorobutane), HFC-329mmz (1,1,1,3,3,3-hexafluoro-2-(trifluoro)propane), HFC-338mf (1,1,1,3,3,4,4,4-octafluoro-butane), HFC-338mcc (1,1,1,2,2,3,4,4-octafluorobutane), HFC-338pcc (1,1,2,2,3,3,4,4-octafluorobutane), HFC-347s (1,1,1,2,2,3,3-heptafluorobutane), HFC-365mfe (1,1,1,3,3-pentafluorobutane), HFC-4310mee (1,1,1,2,3,4,4,5,5,5-decafluoropentane), HFC-1123 (trifluoroethylene), HFC-1132a (1,2-difluoroethylene), FC-1216 (hexafluoro-1-propene), HFC-1223 (3,3,3-trifluoro-1-propene), HFC-1225ze (1,1,3,3,3-pentafluoro-1-propene), HFC-1225ye (1,2,3,3,3-pentafluoro-1-propene), HFC-1225ye (1,1,2,3,3-pentafluoro-1-propene), HFC-1232xf (3,3-difluoro-1-propene), HFC-1234ye (1,2,3,3-tetrafluoro-1-propene), HFC-1234ze (1,3,3,3-tetrafluoro-1-propene), HFC-1234yf (2,3,3,3-tetrafluoro-1-propene), HFC-1234ye (1,1,2,3-tetrafluoro-1-propene), HFC-1234zc (1,1,3,3-tetrafluoro-1-propene), HFC-1243yf (2,3,3-trifluoro-1-propene), HFC-1243ze (1,1,3-trifluoro-1-propene), HFC-1243ye (1,2,3-trifluoro-1-propene), HFC-1243ze (1,3,3-trifluoro-1-propene), HFC-1243zf (3,3,3-trifluoro-1-propene), HFC-1243ye (1,1,2-trifluoro-1-propene), HFC-1261yf (2-fluoropropene), FC-1318my (1,1,1,2,3,4,4,4-octafluoro-2-butene), FC-1318cy (1,1,2,3,3,4,4,4-octafluoro-1-butene), HFC-1327my (1,1,1,2,4,4,4-heptafluoro-2-butene), HFC-1327ye (1,2,3,3,4,4,4-heptafluoro-1-butene), HFC-1327py (1,1,1,2,3,4,4-heptafluoro-2-butene), HFC-1327et (1,3,3,3-tetrafluoro-2-(trifluoromethyl)-1-propene), HFC-1327ez (1,1,3,3,4,4,4-heptafluoro-1-butene), HFC-1327eye (1,1,2,3,4,4,4-heptafluoro-1-butene), HFC-1327cyc (1,1,2,3,3,4,4-heptafluoro-1-butene), HFC-1336yf (2,3,3,4,4,4-hexafluoro-1-butene), HFC-1336ze (1,3,3,4,4,4-hexafluoro-1-butene), HFC-1336eye (1,2,3,4,4,4-hexafluoro-1-butene), HFC-1336eye (1,2,3,3,4,4-hexafluoro-1-butene), HFC-1336pyy (1,1,2,3,4,4-hexafluoro-2-butene), HFC-1336pz (1,1,1,2,4,4-hexafluoro-2-butene), HFC-1336mzy (1,1,1,3,4,4-hexafluoro-2-butene), HFC-1336mzz (1,1,1,4,4,4-hexafluoro-2-butene), HFC-1336qc (1,1,2,3,3,4-hexafluoro-1-butene), HFC-1336pe (1,1,2,3,4,4-hexafluoro-1-butene), HFC-1336 ft (3,3,3-trifluoro-2-(trifluoromethyl)-1-propene), HFC-1345qz (1,1,1,2,4-pentafluoro-2-butene), HFC-1345mzy (1,1,1,3,4-pentafluoro-2-butene), HFC-1345fz (3,3,4,4,4-pentafluoro-1-butene), HFC-1345mzz (1,1,1,4,4-pentafluoro-2-butene), HFC-1345sy (1,1,1,2,3-pentafluoro-2-butene), HFC-1345fyc (2,3,3,4,4-pentafluoro-1-butene), HFC-1345pyz (1,1,2,4,4-pentafluoro-2-butene), HFC-1345cyc (1,1,2,3,3-pentafluoro-1-butene), HFC-1345pyy (1,1,2,3,4-pentafluoro-2-butene), HFC-1345eyc (1,2,3,3,4-pentafluoro-1-butene), HFC-1345ctm (1,1,3,3,3-pentafluoro-2-methyl-1-propene), HFC-1345ftp (2-(difluoromethyl)-3,3,3-trifluoro-1-propene), HFC1345fye (2,3,4,4,4-pentafluoro-1-butene), HFC-1345eyf (1,2,4,4,4-pentafluoro-1-butene), HFC-1345eze (1,3,4,4,4-pentafluoro-1-butene), HFC-1345ezc (1,3,3,4,4-pentafluoro-1-butene), HFC-1345eye (1,2,3,4,4-pentafluoro-1-butene), HFC-1354fzc (3,3,4,4-tetrafluoro-1-butene), HFC-1354ctp (1,1,3,3-tetrafluoro-2-methyl-1-propene), HFC-1354etm (1,3,3,3-tetrafluoro-2-methyl-1-propene), HFC-1354tfp (2-(difluoro-methyl)-3,3-difluoro-1-propene), HFC-1354my (1,1,1,2-tetrafluoro-2-butene), HFC-1354mzy (1,1,1,3-tetrafluoro-2-butene), FC-141-10myy (1,1,1,2,3,4,4,5,5,5-decafluoro-2-pentene), FC-141-10cy (1,1,2,3,3,4,4,5,5,5-decafluoro-1-pentene) HFC-1429mzt (1,1,1,4,4,4-hexafluoro-2-(trifluoromethyl)-2-butene), HFC-1429myz (1,1,1,2,4,4,5,5,5-nonafluoro-2-pentene), HFC-1429mzy (1,1,1,3,4,4,5,5,5-nonafluoro-2-pentene), HFC-1429eyc (1,2,3,3,4,4,5,5,5-nonafluoro-1-pentene), HFC-1429czc (1,1,3,3,4,4,5,5,5-nonafluoro-1-pentene), HFC-1429cycc (1,1,2,3,3,4,4,5,5-nonafluoro-1-pentene), HFC-1429pyy (1,1,2,3,4,4,5,5,5-nonafluoro-2-pentene), HFC-1429myyc (1,1,1,2,3,4,4,5,5-nonafluoro-2-pentene), HFC-1429myye (1,1,2,3,4,5,5,5-nonafluoro-2-pentene), HFC-1429eyym (1,2,3,4,4,4-hexafluoro-3-(trifluoromethyl)-1-butene), HFC-1429cyzm (1,1,2,4,4,4-hexafluoro-3-(trifluoromethyl)-1-butene), HFC-1429mzt (1,1,1,4,4,4-hexafluoro-2-(trifluoromethyl)-2-butene), HFC-1429czym (1,1,3,4,4,4-hexafluoro-3-(trifluoromethyl)-1-butene), HFC-1438fy (2,3,3,4,4,5,5,5-octafluoro-1-pentene), HFC-1438eycc (1,2,3,3,4,4,5,5-octafluoro-1-pentene), HFC-1438ftmc (3,3,4,4,4-pentafluoro-2-(trifluoromethyl)-1-butene), HFC-1438czzm (1,1,4,4,4-pentafluoro-3-(trifluoromethyl)-1-butene), HFC-1438ezym (1,3,4,4,4-pentafluoro-3-(trifluoromethyl)-1-butene), HFC-1438ctmf (1,1,4,4,4-pentafluoro-2-(trifluoromethyl)-1-butene), HFC-1447fzy(3,4,4,4-tetrafluoro-3-(trifluoromethyl)-1-butene), HFC-1447fz (3,3,4,4,5,5,5-heptafluoro-1-pentene), HFC-1447fycc (2,3,3,4,4,5,5-heptafluoro-1-pentene), HFC-1447cz (1,1,3,3,5,5,5-heptafluoro-1-pentene), HFC-1447mytm (1,1,1,2,4,4,4heptafluoro-3-methyl-2-butene), HFC-1447fyz (2,4,4,4-tetrafluoro-3-(trifluoromethyl)-1-butene), HFC-1447ezz (1,4,4,4-tetrafluoro-3-(trifluoromethyl)-1-butene), HFC-1447qzt (1,4,4,4-tetrafluoro-2-(trifluoromethyl)-2-butene), HFC-1447syt (2,4,4,4-tetrafluoro-2-(trifluoromethyl)-2-butene), HFC-1456szt (3-(trifluoromethyl)-4,4,4-trifluoro-2-butene), HFC-1456szy (3,4,4,5,5,5hexafluoro-2-pentene), HFC-1456mstz (1,1,1,4,4,4-hexafluoro-2-methyl-2-butene), HFC-1456fzce (3,3,4,5,5,5-hexafluoro-1-pentene), HFC-1456ftmf (4,4,4-trifluoro-2-(trifluoromethyl)-1-butene), FC-151-12c (1,1,2,3,3,4,4,5,5,6,6,6-dodeca-1-hexene, perfluoro-1-hexene), FC-151-12mcy (1,1,1,2,2,3,4,5,5,6,6,6-dodeca-3-hexene, perfluoro-3-hexene), FC-151-12mmtt (1,1,1,4,4,4-hexafluoro-2,3-bis(trifluoromethyl)-2-butene), FC-151-12mmzz (1,1,1,2,3,4,5,5-nonafluoro-4-(trifluoromethyl)-2-pentene), HFC-152-11mmtz (1,1,1,4,4,5,5,5-octafluoro-2-(trifluoromethyl)-2-pentene), HFC-152-11mmyyz (1,1,1,3,4,5,5,5-octafluoro-4-(trifluoromethyl)-2-pentene), HFC-152-11mmyyz (1,1,1,3,4,5,5,5-octafluoro-4-(trifluoromethyl)-2-pentene), HFC-1549fz (PFBE) (3,3,4,4,5,5,6,6,6-nonafluoro-1-hexene, perfluorobutyl), HFC-1549fztmm (4,4,4-trifluoro-3,3-bis(trifluoromethyl)-1-butene), HFC-1549mmtts (1,1,1,4,4,4-hexafluoro-3-methyl-2-(trifluoromethyl)-2-butene), HFC-1549fycz (2,3,3,5,5,5-hexafluoro-4-(trifluoromethyl)-1-pentene), HFC-1549myts (1,1,1,2,4,4,5,5,5-nonafluoro-3-methyl-2-pentene), HFC-1549mzzz (1,1,1,5,5,5-hexafluoro-4-(trifluoromethyl)-2-pentene), HFC-1558szy (3,4,4,5,5,6,6,6-octafluoro-2-hexene), HFC-1558fzccc (3,3,4,4,5,5,6,6-octafluoro-2-hexene), HFC-1558mmtzc (1,1,1,4,4-pentafluoro-2-(trifluoromethyl)-2-pentene), HFC-1558ftmf (4,4,5,5,5-pentafluoro-2-(trifluoromethyl)-1-pentene), HFC-1567fts (3,3,4,4,5,5,5-heptafluoro-2-methyl-1-pentene), HFC-1567fzsz (4,4,5,5,6,6,6-heptafluoro-2-hexene), HFC-1567fzfc (4,4,5,5,6,6,6-heptafluoro-1-hexene), HFC-1567sfyy (1,1,1,2,2,3,4-heptafluoro-3-hexene), HFC-1567fzfy (4,5,5,5-tetrafluoro-4-(trifluoromethyl)-1-pentene), HFC-1567myzzm (1,1,1,2,5,5,5-heptafluoro-4-methyl-2-pentene), HFC-1567mmtyf (1,1,1,3-tetrafluoro-2-(trifluoromethyl)-2-pentene), FC-161-14myy (1,1,1,2,3,4,4,5,5,6,6,7,7,7-tetradecafluoro-2-heptene), FC-161-14mcyy (1,1,1,2,2,3,4,5,5,6,6,7,7,7-tetradecafluoro-2-heptene), HFC-162-13mzy (1,1,1,3,4,4,5,5,6,6,7,7,7-tridecafluoro-2-heptene), HFC162-13myz (1,1,1,2,4,4,5,5,6,6,7,7,7-tridecafluoro-2-heptene), HFC-162-13mczy (1,1,1,2,2,4,5,5,6,6,7,7,7-tridecafluoro-3-heptene), HFC-162-13mcyz (1,1,1,2,2,3,5,5,6,6,7,7,7-tridecafluoro-3-heptene), CFC-11 (fluorotrichloromethane), CFC-12 (dichlorodifluoromethane), CFC-114 (1,1,2,2-tetrafluoro-1,2-dichloroethane), CFC-114a (1,1,1,2-tetrafluoro-2,2-dichloroethane), CFC-115 (1,1,1,2,2-pentafluoro-2-dichloroethane), HCFC-21 (dichlorofluoromethane), HCFC-22 (chlorodifluoro-methane), HCFC-122 (1,1,2-trichloro-2,2-difluoroethane), HCFC-123 (1,1,1-trifluoro-2,2-dichloroethane), HCFC-124 (1,1,1,2-tetrafluoro-2-chloroethane), HCFC-124a (1,1,2,2-tetrafluoro-2-chloroethane), HCFC-132 (dichlorodifluoroethane), HCFC-133a (1,1,1-trifluoro-2-chloroethane), HCFC-141b (1,1-dichloro-1-fluoroethane), HCFC-142 (1,1-difluoro-2-chloroethane), HCFC-142b (1,1-difluoro-1-chloroethane), HCFC-225ca (3,3-dichloro-1,1,1,2,2-pentafluoropropane), HCFC-225cb (1,3-dichloro-1,1,2,2,3-pentafluoropropane), HCFC-240db (1,1,1,2,3-pentachloropropane), HCFC-243db (1,1,1-trifluoro-2,3-dichloropropane), HCFC-243ab (1,1,1-trifluoro-2,2-dichloropropane), HCFC-244eb (1,1,1,2-tetrafluoro-3-chloropropane), HCFC-244bb (1,1,1,2-tetrafluoro-2-chloropropane), HCFC-244db (1,1,1,3-tetrafluoro-2-chloropropane), HCFC-1111 (1,1,2-trichloro-2-fluoroethylene), HCFC-1113 (1,1,2-trifluoro-2-chloroethylene), HCFC-1223xd (3,3,3-trifluoro-1,2-dichloropropene), HCFC-1224xe (1,3,3,3-tetrafluoro-2-chloropropene), HCFC-1232xf (3,3-difluoro-1,3-dichloropropene), HCFC-1233xf (3,3,3-trifluoro-2-chloropropene), HCFC-1233zd (3,3,3-trifluoro-1-chloropropene), and a mixture thereof, etc.

The multilayer is suitable as a tube for transporting the above-mentioned chemical solution and/or gas, and there may be specifically mentioned fuel tubes such as a feed tube, a return tube, an evaporator tube, a fuel filler tube, an ORVR tube, a reserve tube, a vent tube, etc., a hydrogen transfer tube for fuel cell, an oil tube, an oil drilling tube, a pneumatic, hydraulic tube, a clutch tube, a brake tube, a brake negative pressure tube, a suspension tube, an air tube, a turbo air tube, an air duct tube, a blow-by tube, an EGR valve control tube, a tube for window washer liquid, an engine coolant (LLC) tube, a reservoir tank tube, a urea solution transport tube, a cooler tube for cooling water, cooling medium, a tube for air conditioner refrigerant, a heater tube, a radiator tube, a load heating tube, a floor heating tube, a tube for infrastructure supply, a tube for fire extinguishers and fire extinguish equipment, a tube for medical cooling equipment, a tube for spreading ink, paint, and other chemical solution tube. In particular, it is suitable as a fuel tube. That is, the present invention includes use of the above-mentioned multilayer as a fuel tube.

EXAMPLES

Hereinafter, the present invention will be specifically explained by referring to Examples and Comparative Examples, but the present invention is not limited thereto.

Incidentally, measurement methods of analysis and physical properties in Examples and Comparative Examples, and materials used in Examples and Comparative Examples are shown.

Characteristics of the polyamide were measured by the following methods.
[Relative Viscosity]

According to JIS K-6920, it was measured under the conditions of 96% sulfuric acid, a polyamide concentration of 1% and at a temperature of 25° C.

[Terminal Amino Group Concentration of Polyamide (A1) and Polyamide (A2)]

In an Erlenmeyer flask equipped with a stopcock was charged a predetermined amount of a polyamide sample, and after adding 40 mL of a previously prepared solvent phenol/methanol (volume ratio 9/1) thereto, the mixture was dissolved by stirring with a magnet stirrer and titrated with 0.05N hydrochloric acid using thymol blue as an indicator to determine a terminal amino group concentration.

[Terminal Carboxyl Group Concentration of Polyamide (A1) and Polyamide (A2)]

In a three-necked pear-shaped flask was charged a predetermined amount of a polyamide sample, and after adding 40 mL of benzyl alcohol, the mixture was immersed in an oil bath set at 180° C. under a nitrogen stream. The mixture was dissolved by stirring with a stirring motor attached to the upper part thereof, and titrated with 0.05N sodium hydroxide solution using phenolphthalein as an indicator to determine a terminal carboxyl group concentration.

[Total Concentration of Carboxyl Group and Acid Anhydride Group of Elastomeric Polymer (A3)]

In a three-necked pear-shaped flask was charged a predetermined amount of an elastomeric polymer sample, it was dissolved in 170 mL of toluene, and further 30 mL of ethanol was added to prepare a sample solution, and the solution was titrated with 0.1N KOH ethanol solution using phenolphthalein as an indicator to determine a total concentration of a carboxyl group and an acid anhydride group.

Respective physical properties of the multilayer tube were measured by the following methods.
[Interlayer Adhesiveness (Initial Peeling Strength)]

A tube cut to 200 mm was further cut in half in a spiral shape to prepare a test piece. Using a universal testing machine (Tensilon UTMIII-200, manufactured by Orientec Co., Ltd.), a 90° peeling test was carried out at a tensile speed of 50 mm/min. The peel strength was read from the maximum point of S-S curve, and interlayer adhesiveness was evaluated.

[Durability of Interlayer Adhesiveness (Peeling Strength After Heat Treatment)]

A tube cut to 200 mm was placed in an oven at 160° C. and treated for 30 minutes. Interlayer adhesiveness of the taken out tube was evaluated according to the above-mentioned method. When the peeling strength after the heat treatment was 2.0 N/mm or more, it was judged to be excellent in durability of interlayer adhesiveness.

[Materials Used in Examples and Comparative Examples]
Polyamide (A1)
Production of polyamide 12 (A1-1)

In a pressure-resistant reaction vessel equipped with a stirrer with an internal volume of 70 liters were charged 19.73 kg (100.0 mol) of dodecanelactam, 45.0 g (0.264 mol) of 5-amino-1,3,3-trimethylcyclohexanemethylamine and 0.5 L of distilled water, and after replacing inside of the polymerization tank with nitrogen, the mixture was heated to 180° C. and stirred so that the inside of the reaction system become a uniform state at this temperature. Next, the temperature inside the polymerization tank was raised up to 270° C., the mixture was polymerized under stirring for 2 hours while the pressure inside the tank was adjusted to 3.5 MPa. Thereafter, the pressure was released to normal pressure over about 2 hours, then, the pressure was reduced to 53 kPa, and polymerization was carried out under reduced pressure for 5 hours. Then, nitrogen was introduced into the autoclave to restore the pressure to normal pressure, thereafter the product was taken out from the lower nozzle of the reaction vessel as strands and cut to obtain pellets. The pellets were dried under reduced pressure to obtain polyamide 12 having a relative viscosity of 2.10, a terminal amino group concentration of 48 µeq/g and a terminal carboxyl group concentration of 24 µeq/g (hereinafter this polyamide 12 is referred to as (A1-1).). The ratio $[CH_2]/[NHCO]$ of the number of methylene groups to the number of amide groups of the polyamide 12 (A1-1) is 11.0, which satisfies 8.0 or more.

Polyamide (A2)
Production of Polyamide 6/12 (A2-1)

In a pressure-resistant reaction vessel equipped with a stirrer having an internal volume of 70 liters were charged 9.90 kg (87.5 mol) of caprolactam, 2.69 kg (12.5 mol) of 12-aminododecanoic acid, 20.0 g (0.12 mol) of 5-amino-1,3,3-trimethylcyclohexane-methylamine and 2.0 L of distilled water, the mixture was heated to 100° C. and stirred so that the inside of the reaction system become a uniform state at this temperature. Subsequently, the temperature was further raised up to 260° C., and the mixture was stirred under a pressure of 2.5 MPa for 1 hour. Thereafter, the pressure was released to volatilize the water from the reaction vessel, and the polymerization reaction was carried out under normal pressure at 260° C. for 2 hours, and further the polymerization reaction was carried out at 260° C. under reduced pressure of 53 kPa for 4 hours. After completion of the reaction, the reaction product taken out in a strand shape from the lower nozzle of the reaction vessel was introduced into a water tank to cool them and cut to obtain pellets. The pellets were immersed in hot water to remove unreacted monomer by extraction, and dried under reduced pressure to obtain polyamide 6/12 (caproamide unit/dodecamide unit=87.5/12.5 mol %) (hereinafter this polyamide 6/12 is referred to as (A2-1).) having a relative viscosity of 2.63, a terminal amino group concentration of 54 µeq/g and a terminal carboxyl group concentration of 40 µeq/g. The ratio $[CH_2]/[NHCO]$ of the number of methylene groups to the number of amide groups of the polyamide 6/12 (A2-1) is 5.75, which is less than 8.0.

Polyamide (B1)
Production of Polyamide 6 (B1-1)

In the production of the polyamide 6/12 (A2-1), by the same method as in the production of the polyamide 6/12 (A2-1) except that 9.90 kg (87.5 mol) of caprolactam and 2.69 kg (12.5 mol) of 12-aminododecanoic acid were changed to 11.32 kg (100.0 mol) of caprolactam, and 20.0 g (0.12 mol) of 5-amino-1,3,3-trimethylcyclohexane-methylamine was changed to 80.0 g (0.47 mol) of the same, polyamide 6 (hereinafter this polyamide 6 is referred to as (B1-1).) having a relative viscosity of 2.50, a terminal amino group concentration of 112 µeq/g and a terminal carboxyl group concentration of 33 µeq/g was obtained. The ratio $[CH_2]/[NHCO]$ of the number of methylene groups to the number of amide groups of the polyamide 6 (B1-1) is 5.0, which is less than 8.0.

Elastomeric polymer (A3) containing and/or not containing constitutional unit derived from unsaturated compound having carboxyl group and/or acid anhydride group Maleic anhydride-modified ethylene/1-butene copolymer (A3-1) (available from Mitsui Chemicals, Inc., TAFMER MH5010, acid anhydride group concentration: 50 µeq/g)

Maleic anhydride-modified ethylene/1-butene copolymer (A3-2) (available from Mitsui Chemicals, Inc., TAFMER MH5020, acid anhydride group concentration: 100 µeq/g)

(A) Aliphatic Polyamide Composition
Production of Polyamide 12 Composition (A-1)

With polyamide 12 (A1-1) were previously mixed polyamide 6/12 (A2-1), maleic anhydride-modified ethylene/1-butene copolymer (A3-1), triethylene glycol-bis[3-(3-t-butyl-5-methyl-4-hydroxyphenyl)propionate] (IRGANOX245 available from BASF Japan) as an antioxidant and tris(2,4-di-t-butylphenyl)phosphite (IRGAFOS168 available from BASF Japan) as a phosphorus-based processing stabilizer, the mixture was supplied to a twin-screw melt-kneader (Type: TEX44 manufactured by The Japan Steel Works, LTD.), melt-kneaded at a cylinder temperature of 180° C. to 270° C., and after extruding a molten resin in a strand shape, this was introduced in a water tank, cooled, cut and vacuum dried to obtain pellets of a polyamide 12 composition (hereinafter this polyamide 12 composition is referred to as (A-1).) comprising 0.8 part by mass of the antioxidant and 0.2 part by mass of the phosphorus-based processing stabilizer based on a total 100 parts by mass of the polyamide 12 (A1-1)/polyamide 6/12 (A2-1)/maleic anhydride-modified elastomeric polymer (A3-1)=55.0/25.0/20.0 (% by mass). Also, the terminal amino group concentration [A] (µeq/g) and the terminal carboxyl group concentration [B] (µeq/g) (the values calculated from the respective terminal amino group concentrations (µeq/g) and terminal carboxyl group concentrations (µeq/g) of the polyamide (A1) and polyamide (A2) per 1 g of the aliphatic polyamide composition (A) and the respective mixing mass ratio are made the terminal amino group concentration [A] (µeq/g) and the terminal carboxyl group concentration [B] (µeq/g) per 1 g of the aliphatic polyamide composition (A). Hereinafter the same.) of the polyamide 12 composition (A-1) satisfy [A]>[B]+5.

Production of Polyamide 12 Composition (A-2)

In the production of the polyamide 12 composition (A-1), by the same method as in the production of the polyamide 12 composition (A-1) except that the added amounts of the polyamide 12 (A1-1) and the polyamide 6/12 (A2-1) were changed, pellets of a polyamide 12 composition (hereinafter this polyamide 12 composition is referred to as (A-2).) comprising 0.8 part by mass of the antioxidant and 0.2 part by mass of the phosphorus-based processing stabilizer based on a total 100 parts by mass of the polyamide 12 (A1-1)/polyamide 6/12 (A2-1)/maleic anhydride-modified elastomeric polymer (A3-1)=65.0/15.0/20.0 (% by mass) was obtained. Also, the terminal amino group concentration [A] (µeq/g) and the terminal carboxyl group concentration [B] (µeq/g) of the polyamide 12 composition (A-2) satisfy [A]>[B]+5.

Production of Polyamide 12 Composition (A-3)

In the production of the polyamide 12 composition (A-1), by the same method as in the production of the polyamide 12 composition (A-1) except that the added amounts of the polyamide 12 (A1-1) and the polyamide 6/12 (A2-1) were changed, pellets of a polyamide 12 composition (hereinafter this polyamide 12 composition is referred to as (A-3).) comprising 0.8 part by mass of the antioxidant and 0.2 part by mass of the phosphorus-based processing stabilizer based on a total 100 parts by mass of the polyamide 12 (A1-1)/polyamide 6/12 (A2-1)/maleic anhydride-modified elastomeric polymer (A3-1)=60.0/20.0/20.0 (% by mass) was obtained. Also, the terminal amino group concentration [A] (µeq/g) and the terminal carboxyl group concentration [B] (µeq/g) of the polyamide 12 composition (A-3) satisfy [A]>[B]+5.

Production of Polyamide 12 Composition (A-4)

In the production of the polyamide 12 composition (A-1), by the same method as in the production of the polyamide 12 composition (A-1) except for changing the maleic anhydride-modified ethylene/1-butene copolymer (A3-1) to (A3-2), pellets of a polyamide 12 composition (hereinafter this polyamide 12 composition is referred to as (A-5).) comprising 0.8 part by mass of the antioxidant and 0.2 part by mass of the phosphorus-based processing stabilizer based on a total 100 parts by mass of the polyamide 12 (A1-1)/polyamide 6/12 (A2-1)/elastomeric polymer (A3-2)=55.0/25.0/20.0 (% by mass) was obtained. Also, the terminal amino group concentration [A] (µeq/g) and the terminal carboxyl group concentration [B] (μeq/g) of the polyamide 12 composition (A-4) satisfy [A]>[B]+5.

Production of Polyamide 12 Composition (A-5)

In the production of the polyamide 12 composition (A-1), by the same method as in the production of the polyamide 12 composition (A-1) except for not using the polyamide 6/12 (A2-1) and benzenesulfonic acid butyramide was injected as a plasticizer by a quantitative pump from the middle of the cylinder of the twin-screw melt-kneader, pellets of a polyamide 12 composition (hereinafter this polyamide 12 composition is referred to as (A-5).) comprising 0.8 part by mass of the antioxidant and 0.2 part by mass of the phosphorus-based processing stabilizer based on a total 100 parts by mass of the polyamide 12 (A1-1)/maleic anhydride-modified elastomeric polymer (A3-1)/plasticizer=87.5/10.0/2.5 (% by mass) was obtained. Also, the terminal amino group concentration [A] (μeq/g) and the terminal carboxyl group concentration [B] (μeq/g) of the polyamide 12 composition (A-5) satisfy [A]>[B]+5.

Production of Polyamide 12 Composition (A-6)

In the production of the polyamide 12 composition (A-1), by the same method as in the production of the polyamide 12 composition (A-1) except for not using the polyamide 6/12 (A2-1), pellets of a polyamide 12 composition (hereinafter this polyamide 12 composition is referred to as (A-6).) comprising 0.8 part by mass of the antioxidant and 0.2 part by mass of the phosphorus-based processing stabilizer based on a total 100 parts by mass of the polyamide 12 (A1-1)/maleic anhydride-modified elastomeric polymer (A3-1)=80.0/20.0 (% by mass) was obtained. Also, the terminal amino group concentration [A] (μeq/g) and the terminal carboxyl group concentration [B] (μeq/g) of the polyamide 12 composition (A-11) satisfy [A]>[B]+5.

Polyamide Composition (B)

Production of Polyamide 6 Composition (B-1)

In the production of the polyamide 12 composition (A-1), by the same method as in the production of the polyamide 12 composition (A-1) except for changing the polyamide 12 (A1-1) to the polyamide 6 (B1-1) and not using the polyamide 6/12 (A2-1), pellets of a polyamide 6 composition (hereinafter this polyamide 6 composition is referred to as (B-1).) comprising 0.8 part by mass of the antioxidant and 0.2 part by mass of the phosphorus-based processing stabilizer based on a total 100 parts by mass of the polyamide 6 (B1-1)/maleic anhydride-modified elastomeric polymer (A3-1)=85.0/15.0 (% by mass) was obtained.

Production of Polyamide 6 Composition (B-2)

In the production of the polyamide 6 composition (B-1), by the same method as in the production of the polyamide 6 composition (B-1) except for injecting benzene-sulfonic acid butyramide as a plasticizer by a quantitative pump, pellets of a polyamide 6 composition (hereinafter this polyamide 6 composition is referred to as (B-2).) comprising the polyamide 6 (B1-1)/maleic anhydride-modified elastomeric polymer (A3-1)/plasticizer=75.0/10.0/15.0 (% by mass) was obtained.

Production of Conductive Polyamide 6 Composition (B-3)

In the production of the polyamide 6 composition (B-1), by the same method as in the production of the polyamide 6 composition (B-1) except for using carbon black (Vulcan XC-72 available from Cabot Corporation) as a conductive filler and changing the cylinder temperature from 270° C. to 300° C., pellets of a conductive polyamide 6 composition (hereinafter this conductive polyamide 6 composition is referred to as (B-3).) comprising the polyamide 6 (B1-1)/maleic anhydride-modified elastomeric polymer (A3-1)/conductive filler=60.0/20.0/20.0 (% by mass) was obtained.

Example 1

Using the polyamide 12 composition (A-1) and the polyamide 6 composition (B-1) shown above, by a PAL32 (manufactured by Maillefer) two-layer tube molding machine, (A-1) was melted at an extrusion temperature of 260° C. and (B-1) was melted at an extrusion temperature of 260° C. separately, and the discharged molten resins were merged by an adapter to form a laminated tubular body. Subsequently, it was cooled by a sizing die whose size was controlled and carried out take over, and when it was made Layer (a) (outermost layer) composed of (A-1) and Layer (b) (innermost layer) composed of (B-1), a multilayer tube having a layer constitution of (a)/(b)=0.70/0.30 mm, an inner diameter of 6.0 mm and an outer diameter of 8.0 mm was obtained. The results of measurement of physical properties of the multilayer tube are shown in Table 1.

Example 2

In the same method as in Example 1 except for changing the polyamide 12 composition (A-1) used in the outermost layer of Example 1 to (A-2), the multilayer tube having the layer constitution shown in Table 1 was obtained. The results of measurement of physical properties of the multilayer tube are shown in Table 1.

Example 3

In the same method as in Example 1 except for changing the polyamide 12 composition (A-1) used in the outermost layer of Example 1 to (A-3), the multilayer tube having the layer constitution shown in Table 1 was obtained. The results of measurement of physical properties of the multilayer tube are shown in Table 1.

Example 4

In the same method as in Example 1 except for changing the polyamide 12 composition (A-1) used in the outermost layer of Example 1 to (A-4), the multilayer tube having the layer constitution shown in Table 1 was obtained. The results of measurement of physical properties of the multilayer tube are shown in Table 1.

Example 5

In the same method as in Example 1 except for changing the polyamide 6 composition (B-1) used in the innermost layer of Example 3 to (B-2), the multilayer tube having the layer constitution shown in Table 1 was obtained. The results of measurement of physical properties of the multilayer tube are shown in Table 1.

Example 6

In the same method as in Example 1 except for changing polyamide 6 composition (B-1) used in the innermost layer of Example 3 to (B-3) and the extrusion temperature of (B-3) from 260° C. to 280° C., the multilayer tube having the layer constitution shown in Table 1 was obtained. The results of measurement of physical properties of the multilayer tube are shown in Table 1. Also, when conductivity of the multilayer tube was measured in accordance with SAE J-2260, it was $10^6$ Ω/square or less, so that it was confirmed to be excellent in static electricity removal property.

Example 7

Using the polyamide 12 composition (A-1) and polyamide 6 composition (B-1) shown above, by a PAL32 (manufactured by Maillefer) three-layer tube molding machine, (A-1) was melted at an extrusion temperature of 260° C. and (B-1) was melted at an extrusion temperature of 260° C. separately, and the discharged molten resins were merged by an adapter to form a laminated tubular body. Subsequently, it was cooled by a sizing die whose size was controlled and carried out take over, and when it was made Layer (a) (outermost layer) composed of (A-1), Layer (b) (intermediate layer) composed of (B-1) and Layer (a') (innermost layer) composed of (A-1), a multilayer tube having a layer constitution of (a)/(b)/(a')=0.30/0.50/0.20 mm, an inner diameter of 6.0 mm and an outer diameter of 8.0 mm was obtained. The results of measurement of physical properties of the multilayer tube are shown in Table 2.

Example 8

In the same method as in Example 7 except for changing the polyamide 12 composition (A-1) used in the outermost layer and innermost layer in Example 7 to (A-2), the multilayer tube having the layer constitution shown in Table 2 was obtained. The results of measurement of physical properties of the multilayer tube are shown in Table 2.

Example 9

In the same method as in Example 7 except for changing the polyamide 12 composition (A-1) used in the outermost layer and innermost layer in Example 7 to (A-3), the multilayer tube having the layer constitution shown in Table 2 was obtained. The results of measurement of physical properties of the multilayer tube are shown in Table 2.

Example 10

In the same method as in Example 7 except for changing the polyamide 12 composition (A-1) used in the outermost layer and innermost layer in Example 7 to (A-4), the multilayer tube having the layer constitution shown in Table 2 was obtained. The results of measurement of physical properties of the multilayer tube are shown in Table 2.

Example 11

In the same method as in Example 9 except for changing the polyamide 6 composition (B-1) of Example 9 to (B-2), the multilayer tube having the layer constitution shown in Table 2 was obtained. The results of measurement of physical properties of the multilayer tube are shown in Table 2.

Comparative Example 1

In the same method as in Example 1 except for changing the polyamide 12 composition (A-1) used in the outermost layer in Example 1 to (A-5), the multilayer tube having the layer constitution shown in Table 1 was obtained. The results of measurement of physical properties of the multilayer tube are shown in Table 1.

Comparative Example 2

In the same method as in Example 1 except for changing the polyamide 12 composition (A-1) used in the outermost layer in Example 1 to (A-6), the multilayer tube having the layer constitution shown in Table 1 was obtained. The results of measurement of physical properties of the multilayer tube are shown in Table 1.

Comparative Example 3

In the same method as in Example 7 except for changing the polyamide 12 composition (A-1) used in the outermost layer and innermost layer in Example 7 to (A-5), the multilayer tube having the layer constitution shown in Table 1 was obtained. The results of measurement of physical properties of the multilayer tube are shown in Table 2.

Comparative Example 4

In the same method as in Example 7 except for changing the polyamide 12 composition (A-1) used in the outermost layer and innermost layer in Example 7 to (A-6), the multilayer tube having the layer constitution shown in Table 1 was obtained. The results of measurement of physical properties of the multilayer tube are shown in Table 2.

TABLE 1

| | Outermost layer | | Innermost layer | | Peeling strength [N/mm] | |
|---|---|---|---|---|---|---|
| | | | | | | After heat treatment (160° C., 12 min) |
| | Kind | Thickness [mm] | Kind | Thickness [mm] | Initial | |
| Example 1 | A-1 | 0.70 | B-1 | 0.30 | Peeling impossible | 4.1 |
| Example 2 | A-2 | 0.70 | B-1 | 0.30 | Peeling impossible | 3.2 |
| Example 3 | A-3 | 0.70 | B-1 | 0.30 | Peeling impossible | 3.7 |
| Example 4 | A-4 | 0.70 | B-1 | 0.30 | Peeling impossible | Peeling impossible |
| Example 5 | A-3 | 0.70 | B-2 | 0.30 | Peeling impossible | 2.7 |
| Example 6 | A-3 | 0.70 | B-3 | 0.30 | Peeling impossible | 3.1 |
| Comparative Example 1 | A-5 | 0.70 | B-1 | 0.30 | 0.5 | 0.3 |
| Comparative Example 2 | A-6 | 0.70 | B-1 | 0.30 | 0.8 | 0.5 |

TABLE 2

| | Outermost layer | | Intermediate layer | | Innermost layer | | Peeling strength [N/mm] | |
|---|---|---|---|---|---|---|---|---|
| | Kind | Thickness [mm] | Kind | Thickness [mm] | Kind | Thickness [mm] | Initial | After heat treatment (160° C., 12 min) |
| Example 7 | A-1 | 0.30 | B-1 | 0.50 | A-1 | 0.20 | Peeling impossible | 3.5 |
| Example 8 | A-2 | 0.30 | B-1 | 0.50 | A-2 | 0.20 | Peeling impossible | 3.0 |
| Example 9 | A-3 | 0.30 | B-1 | 0.50 | A-3 | 0.20 | Peeling impossible | 3.5 |
| Example 10 | A-4 | 0.30 | B-1 | 0.50 | A-4 | 0.20 | Peeling impossible | 4.1 |
| Example 11 | A-3 | 0.30 | B-2 | 0.50 | A-3 | 0.20 | Peeling impossible | 2.4 |
| Comparative Example 3 | A-5 | 0.30 | B-1 | 0.50 | A-5 | 0.20 | 0.4 | 0.2 |
| Comparative Example 4 | A-6 | 0.30 | B-1 | 0.50 | A-6 | 0.20 | 0.5 | 0.4 |

As clearly seen from Tables 1 and 2, the multilayer tubes of Comparative Example 1, 2, 3 and 4 having Layer (a) which did not use the polyamide (A2) specified in the present invention were inferior in interlayer adhesiveness and durability thereof. On the other hand, it is clear that the multilayer tubes of Examples 1 to 11 which satisfy the conditions specified in the present invention have good various characteristics such as interlayer adhesiveness and durability thereof, etc.

The invention claimed is:

1. A multilayer tube which comprises
two or more layers containing Layer (a) and Layer (b), wherein
at least a pair of the Layer (a) and the Layer (b) are disposed adjacent to each other,
the Layer (a) contains an aliphatic polyamide composition (A),
the Layer (b) contains an aliphatic polyamide composition (B),
the aliphatic polyamide composition (A) contains a polyamide (A1), a polyamide (A2) and an elastomeric polymer (A3),
the polyamide (A1) is an aliphatic polyamide which has a ratio of a number of methylene groups to a number of amide groups of 8.0 or more, and which does not contain a copolymer containing a unit "a" derived from ε-caprolactam or ε-aminocaproic acid and a unit "b" derived from aminododecanoic acid or w-laurolactam, and is contained in an amount of 30% by mass or more and 85% by mass or less in the aliphatic polyamide composition (A),
the polyamide (A2) is an aliphatic polyamide which contains a copolymer containing a unit "a" derived from ε-caprolactam or ε-aminocaproic acid and a unit "b" derived from aminododecanoic acid or ω-laurolactam, and is contained in an amount of 10% by mass or more and 35% by mass or less in the aliphatic polyamide composition (A),
the elastomeric polymer (A3) is an elastomeric polymer which may contain a constitutional unit derived from an unsaturated compound having a carboxyl group(s) and/or an acid anhydride group(s), and is contained in an amount of 5% by mass or more and 30% by mass or less in the aliphatic polyamide composition (A),
the aliphatic polyamide composition (B) contains a polyamide (B1) and an elastomeric polymer (B2),
the polyamide (B1) is an aliphatic polyamide which has a ratio of a number of methylene groups to a number of amide groups of less than 8.0, and is contained in an amount of 55% by mass or more and 95% by mass or less in the aliphatic polyamide composition (B),
the elastomeric polymer (B2) is an elastomeric polymer which contains a constitutional unit derived from an unsaturated compound having a carboxyl group(s) and/or an acid anhydride group(s), and is contained in an amount of 5% by mass or more and 30% by mass or less in the aliphatic polyamide composition (B) and
the wall thickness of the multilayer tube is 0.5 mm or more and 25 mm or less.

2. The multilayer tube according to claim 1, wherein the polyamide (A1) is at least one kind of a homopolymer selected from the group consisting of polyundecamide (polyamide 11), polydodecamide (polyamide 12), polyhexamethylene dodecamide (polyamide 612), polydecamethylene sebacamide (polyamide 1010), polydecamethylene dodecamide (polyamide 1012) and polydodecamethylene dodecamide (polyamide 1212), and/or at least one kind of a copolymer using two or more kinds of raw material monomers forming the homopolymers.

3. The multilayer tube according to claim 1, wherein the polyamide (A2) is polyamide 6/12 and/or polyamide 6/66/12.

4. The multilayer tube according to claim 1, wherein the polyamide (A2) contains the unit "a" derived from ε-caprolactam or ε-aminocaproic acid in an amount of 50% by mass or more.

5. The multilayer tube according to claim 1, wherein the elastomeric polymer (A3) contains an elastomeric polymer which contains a constitutional unit derived from an unsaturated compound having a carboxyl group(s) and/or an acid anhydride group(s) in an amount of 60% by mass or more in 100% by mass of the elastomeric polymer (A3).

6. The multilayer tube according to claim 1, wherein the polyamide (B1) is at least one kind of a homopolymer selected from the group consisting of polycaproamide (polyamide 6), polyhexamethylene adipamide (polyamide 66), polyhexamethylene azelamide (polyamide 69), and polyhexamethylene sebacamide (polyamide 610), and/or at least one kind of a copolymer using two or more kinds of raw material monomers forming the homopolymers.

7. The multilayer tube according to claim 1, wherein when the terminal amino group concentration which is summed values of the respective terminal amino group concentrations (μeq/g) of the polyamide (A1) and the polyamide (A2) per 1 g of the aliphatic polyamide composition (A) multiplying a mixing mass ratio thereof is made [A](μeq/g), and when the terminal carboxyl group concentration which is summed values of the respective terminal carboxyl group concentrations (μeq/g) of the polyamide (A1) and the polyamide (A2) per 1 g of the aliphatic polyamide composition (A) multiplying a mixing mass ratio thereof is made [B] (μeq/g), then [A]>[B]+5.

8. The multilayer tube according to claim 1, wherein the Layer (a) contains 40% by mass or more and 100% by mass or less of the aliphatic polyamide composition (A), and the Layer (b) contains 60% by mass or more and 100% by mass or less of the aliphatic polyamide composition (B).

9. The multilayer tube according to claim 1, which is produced by coextrusion molding.

10. The multilayer tube according to claim 1, which is used as a chemical solution and/or gas transport tube.

11. The multilayer tube according to claim 1, wherein a shape is a hollow body.

12. The multilayer tube according to claim 11, which has at least one layer of the Layer (b) disposed inside the Layer (a).

13. The multilayer tube according to claim 11, wherein the Layer (a), the Layer (b) and the Layer (a) are laminated in this order from outside, and the respective layers are adjacent to each other.

* * * * *